(12) United States Patent
Ceylan et al.

(10) Patent No.: US 9,275,498 B2
(45) Date of Patent: Mar. 1, 2016

(54) GPU-ACCELERATED PATH RENDERING

(71) Applicant: QUALCOMM Incorporated, San Diego, CA (US)

(72) Inventors: Usame Ceylan, Orlando, FL (US); Vineet Goel, Winter Park, FL (US)

(73) Assignee: Qualcomm Incorporated, San Diego, CA (US)

( * ) Notice: Subject to any disclaimer, the term of this patent is extended or adjusted under 35 U.S.C. 154(b) by 327 days.

(21) Appl. No.: 13/841,637

(22) Filed: Mar. 15, 2013

(65) Prior Publication Data
US 2014/0043330 A1 Feb. 13, 2014

Related U.S. Application Data

(60) Provisional application No. 61/681,498, filed on Aug. 9, 2012, provisional application No. 61/713,377, filed on Oct. 12, 2012, provisional application No. 61/723,274, filed on Nov. 6, 2012, provisional application No. 61/755,312, filed on Jan. 22, 2013, provisional application No. 61/755,359, filed on Jan. 22, 2013, provisional application No. 61/755,391, filed on Jan. 22, 2013.

(51) Int. Cl.
*G06T 11/20* (2006.01)
*G06T 17/20* (2006.01)
*G06T 9/00* (2006.01)

(52) U.S. Cl.
CPC . *G06T 17/20* (2013.01); *G06T 9/00* (2013.01); *G06T 11/203* (2013.01); *G06T 2200/28* (2013.01)

(58) Field of Classification Search
None
See application file for complete search history.

(56) References Cited

U.S. PATENT DOCUMENTS

| 7,190,367 | B2 | 3/2007 | Perry et al. | |
|---|---|---|---|---|
| 7,589,730 | B1* | 9/2009 | Brown | G06T 11/203 345/441 |
| 7,684,641 | B1 | 3/2010 | Toksvig | |
| 8,044,955 | B1 | 10/2011 | Yhann | |
| 8,243,070 | B1 | 8/2012 | Brown | |
| 2005/0195188 | A1* | 9/2005 | Goel et al. | 345/423 |
| 2006/0050072 | A1* | 3/2006 | Goel | 345/423 |
| 2008/0198168 | A1 | 8/2008 | Jiao et al. | |
| 2009/0237401 | A1* | 9/2009 | Wei | G06T 11/203 345/423 |
| 2010/0289802 | A1* | 11/2010 | Falchetto | G06T 11/203 345/442 |

(Continued)

FOREIGN PATENT DOCUMENTS

EP 2107528 A1 10/2009

OTHER PUBLICATIONS

Path Rasterizer for OpenVG, Liland, 2007.*

(Continued)

*Primary Examiner* — Ming Hon
*Assistant Examiner* — Phong Nguyen
(74) *Attorney, Agent, or Firm* — Shumaker & Sieffert, P.A.

(57) ABSTRACT

A tessellation unit of a graphics processing unit (GPU) determines domain coordinates for vertices of a received primitive. The tessellation unit outputs the determined domain coordinates for the vertices. The tessellation unit further determines that a domain type for the received primitive is not one of tri, isoline, or quad domain, and outputs information indicative of a graphical feature associated with one or more of the determined domain coordinates when the domain type is not one of the tri, isoline, or quad domain.

28 Claims, 15 Drawing Sheets

(56) References Cited

U.S. PATENT DOCUMENTS

| | | | |
|---|---|---|---|
| 2011/0057931 A1 | 3/2011 | Goel et al. | |
| 2011/0090228 A1* | 4/2011 | Persson | G06T 11/203 |
| | | | 345/443 |
| 2011/0285711 A1 | 11/2011 | Kilgard | |
| 2011/0285720 A1 | 11/2011 | Kilgard | |
| 2011/0285724 A1* | 11/2011 | Kilgard | 345/443 |
| 2011/0285740 A1 | 11/2011 | Kilgard | |
| 2011/0285741 A1 | 11/2011 | Kilgard | |
| 2011/0285742 A1 | 11/2011 | Kilgard et al. | |
| 2011/0285747 A1 | 11/2011 | Kilgard | |
| 2011/0310102 A1 | 12/2011 | Chang | |
| 2012/0075310 A1 | 3/2012 | Michail et al. | |
| 2012/0293515 A1 | 11/2012 | Clarberg et al. | |
| 2013/0120391 A1 | 5/2013 | Brown | |
| 2013/0162651 A1* | 6/2013 | Martin | G06T 17/20 |
| | | | 345/441 |
| 2014/0043341 A1 | 2/2014 | Goel et al. | |
| 2014/0043342 A1 | 2/2014 | Goel et al. | |

OTHER PUBLICATIONS

Hardware-Determined Feature Edges, McGuire et al., 2004.*
Shader-Based Antialiased Dashed Stroked Polylines, Rougier, 2013.*
International Preliminary Report on Patentability from International Application No. PCT/US2013/051525, dated Nov. 13, 2014, 8 pp.
Conversy S., et al., "The svgl toolkit: enabling fast rendering of rich 2D graphics" Technical Report—Ecole Des Mines De Nantes, No. 02/01/info, 2002, XP002539626 France, 11 pp.
Figueiredo Luiz Henrique de., "IV.4 Adaptive Sampling of Parametric Curves" In: Alan W. Paeth: "Graphics Gems V", 1995, Morgan Kaufmann, San Francisco, CA, pp. 173-178, XP002715690, ISBN: 0-12-543455-3.
Hexadecimal: "GPU Experiments: Tessellation example", Feb. 19, 2010, XP055085172, Retrieved from the Internet: URL: http://gpuexperiments.blogspot.de/2010   /02/tessellation-example.html [retrieved on Oct. 24, 2013], 4 pp.
International Search Report and Written Opinion—PCT/US2013/051525—ISA/EPO—Nov. 18, 2013, 12 pp.
Kilgard, et al., "GPU-accelerated Path Rendering", Computer Graphics Proceedings, SIGGraph Asia, 2012, 10 pp.
Loop, et al., "Resolution Independent Curve Rendering using Programmable Graphics Hardware," Transactions on Graphics (TOG), Proceedings of ACM SIGGRAPH, Jul. 2005, vol. 24, No. 3, pp. 1000-1009.
Peters, "Mid-Structures Linking Curved and Piecewise Linear Geometry," In Proceedings of SIAM conference, Nov. 2004, 16 pp.
Segal M., et al., "The OpenGL Graphics System: A Specification", Chapter 11: Programmable Vertex Processing, Version 4.3 (Core Profile)—Aug. 6, 2012, XP002715730, pp. 322-370, sections 11.2, 11.2.2, 11.2.3.3; figures 11.1-11.4.
Yeo, et al., "Efficient Pixel-Accurate Rendering of Curved Surfaces," In Proceedings of I3D'12 (2012), 9 pp. (Applicant points out that, in accordance with MPEP 609.04(a), the 2012 year of publication is sufficiently earlier than the effective U.S. filing date and any foreign priority date of Mar. 15, 2013 so that the particular month of publication is not in issue.)
Zink et al., "Practical Rendering & Computation with Direct3D 11," Overview of Direct 3D, CRC Press, Nov. 2, 2011, pp. 4-7.
"OpenGL Programming Guide: The Official Guide to Learning OpenGL, Version 1.1, Chapter 14," Jan. 1, 1997, 21 pp.
Response to Written Opinion dated Nov. 18, 2013, from International Application No. PCT/US2013/051525, filed on Jun. 4, 2014, 6 pp.
Second Written Opinion from International Application No. PCT/US2013/051525, dated Jul. 22, 2014, 7 pp.
"Graphics Pipeline," Windows, Dec Center—Desktop, retrieved on Mar. 15, 2013 from http://msdn.microsoft.com/en-us/enus/%20library/windows/desktop/ff476882%28v=vs.85%29.aspx, 2 pp.
Rice, et al., "Open VG Specification," Version 1.1, Dec. 3, 2008, retrieved from www.khronos.org/registry/vg/specs/openvg-1.1.pdf, 253 pp.
Kilgard, et al. "An Introduction to NV_path_rendering," NVIDIA Corporation, Jun. 8, 2011, 81 slides.
"NV_path_rendering Frequently Asked Questions," NVIDIA Corporation, Jun. 13, 2011, 15 pp.

* cited by examiner tessDelta

GPU-ACCELERATED PATH RENDERING

This application claims the benefit of U.S. Provisional Application No. 61/681,498, filed Aug. 9, 2012, U.S. Provisional Application No. 61/755,359, filed Jan. 22, 2013, U.S. Provisional Application No. 61/713,377, filed Oct. 12, 2012, U.S. Provisional Application No. 61/755,312, filed Jan. 22, 2013, U.S. Provisional Application No. 61/723,274, filed Nov. 6, 2012, and U.S. Provisional Application No. 61/755,391, filed Jan. 22, 2013, the entire content of each of which is incorporated herein by reference.

TECHNICAL FIELD

This disclosure relates to graphics processing, and more particularly, to techniques for path rendering.

BACKGROUND

Path rendering may refer to the rendering of two-dimensional (2D) vector graphics paths (alternatively referred to herein as "paths"), each of which may include one or more path segments. When a path includes two or more path segments, the individual path segments may be of the same type or of different types. The types of path segments may include, for example, a line, an elliptic arc, a quadratic Bézier curve, and a cubic Bézier curve. In some examples, the path segment types may be defined in accordance with a standard vector graphics application programming interface (API), such as, e.g., the Open Vector Graphics (OpenVG) API.

Graphics processing units (GPUs) typically implement a three-dimensional (3D) graphics pipeline that is designed to be compliant with one or more 3D graphics APIs. Because the prevailing 3D graphics APIs in use today do not require that compliant devices support path rendering commands, modern GPUs often provide little to no hardware acceleration for path rendering commands. For example, a typical 3D graphics pipeline implemented in a modern GPU may include a rasterizer that is designed to rasterize low-order, non-curved, 3D graphics primitives (such as, e.g., points, lines and triangles), but is not capable of directly rendering curved primitives (such as, e.g., elliptic arcs and Bézier curves).

SUMMARY

The techniques in this disclosure provide a graphics processing unit (GPU) that includes tessellation hardware for hardware-accelerated path rendering in a 3D graphics pipeline. By using the GPU to tessellate a path segment into line segments, the burden of preprocessing path segments is lifted from the central processing unit (CPU), thereby freeing up processing resources for other CPU tasks. Moreover, the GPU may, in some examples, utilize a highly-parallel, modern GPU tessellation architecture to perform the tessellation operations, which may, in some examples, allow the GPU to tessellate a path segment in a more efficient manner than the CPU. In addition, because the tessellation occurs in the GPU, rather than in the CPU, a multitude of tessellated primitives do not need to be stored in system memory and do not need to be passed from the CPU to the GPU, thereby reducing the memory footprint needed for path rendering as well as the memory bandwidth needed for path rendering.

In some examples, the GPU may be able to tessellate and render a path segment using a graphics architecture that is specified by a particular 3D graphics application programming interface (API), such as, e.g., the DirectX 11 APIs described in more detail, the techniques described in this disclosure describe possible modifications to the graphics hardware to allow for dashing, end caps, re-tessellation, and cusp handling using re-tessellation. In this manner, the techniques described in this disclosure allow for graphics hardware of the DirectX 11 architecture, with some modifications, to perform path rendering with dashing, caps, and that supports cusps. However, the techniques are not so limited and can be used for other types of path rendering, as well as for techniques in addition to or instead of path rendering.

The techniques of this disclosure include a modified tessellation unit, which is configured in some instances to output information indicative of a graphical feature. Traditionally, the tessellation unit operates on isoline, tri, and quad domains. The domains represent a two dimensional lines, triangles, and quadrilaterals, for which the tessellator determines a number of domain coordinates representing more detailed versions of the line, triangle, or quad, based on one or more tessellation factors. The techniques of this disclosure add new domain types, which cause the tessellator to perform additional operations, including outputting the information indicative of a graphical feature. The information of a graphical feature may be associated with one or more domain coordinates which the tessellation unit outputs, and may indicate whether the domain coordinates are associated with graphical features, such as start caps, end caps, joins, and line segments. In addition, the modified tessellation unit of this disclosure may be configured to output other information as part of outputting the information indicative of a graphical feature. By outputting information indicative of a graphical feature, the modified tessellation unit of this disclosure may provide information to other stages of a graphics pipeline, e.g., a domain shader, geometry shader, etc., which may enable the other stages to perform operations based on the information indicative of the graphical feature.

As one non-limiting example, a domain shader may interpret the information indicative of the graphical feature in order to determine vertex coordinates based on the domain coordinates output by the modified tessellation unit. The domain shader may determine vertex coordinates based on the domain coordinates differently based on, e.g., whether the information indicates that the domain coordinates are associated with a start cap, end cap, join, line segment or another feature. This ability to provide context with the domain coordinates may allow tessellation stages of a graphics processing unit to add graphical features, such as joins, and caps, and to perform re-tessellation and cusp handling, in accordance with the techniques of this disclosure.

In one example, this disclosure describes a method comprising determining, with a tessellation unit of a graphics processing unit (GPU), domain coordinates for vertices of a received primitive, outputting, with the tessellation unit, the determined domain coordinates for the vertices, determining, with the tessellation unit, that a domain type for the received primitive is not one of tri, isoline, or quad domain, and outputting, with the tessellation unit, information indicative of a graphical feature associated with one or more of the determined domain coordinates when the domain type is not one of the tri, isoline, or quad domain.

In another example, this disclosure describes a device that includes a GPU comprising a tessellation unit configured to determine domain coordinates for vertices of a received primitive, output the determined domain coordinates for the vertices, determine that a domain type for the received primitive is not one of tri, isoline, or quad domain, and output information indicative of a graphical feature associated with one or more of the determined domain coordinates when the domain type is not one of the tri, isoline, or quad domain.

In another example, this disclosure describes an apparatus that includes means for determining domain coordinates for vertices of a received primitive, means for outputting the determined domain coordinates for the vertices, means for determining that a domain type for the received primitive is not one of tri, isoline, or quad domain, and means for outputting information indicative of a graphical feature associated with one or more of the determined domain coordinates when the domain type is not one of the tri, isoline, or quad domain.

In another example, this disclosure describes a non-transitory computer-readable storage medium storing instructions that, when executed, cause one or more processors to determine domain coordinates for vertices of a received primitive, output the determined domain coordinates for the vertices, determine that a domain type for the received primitive is not one of tri, isoline, or quad domain, and output information indicative of a graphical feature associated with one or more of the determined domain coordinates when the domain type is not one of the tri, isoline, or quad domain.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
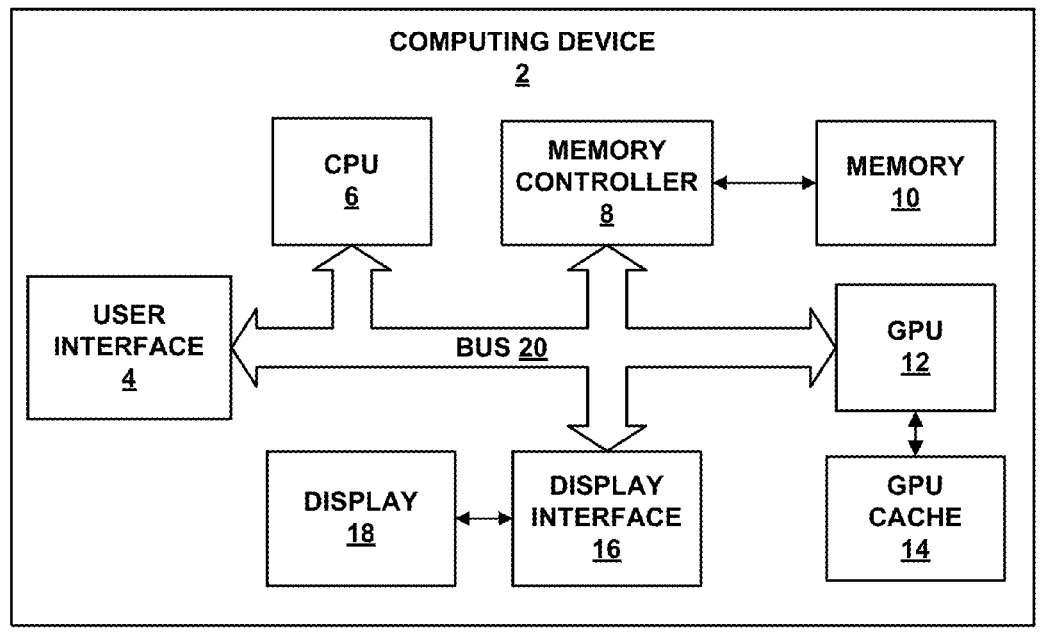
FIG. 1 is a block diagram illustrating an example computing device that may be used to implement the GPU-accelerated path rendering techniques of this disclosure.

This disclosure is directed to techniques for performing GPU-accelerated path rendering. Path rendering may refer to the rendering of two-dimensional (2D) vector graphics paths (alternatively referred to herein as "paths"), each of which may include one or more path segments. When a path includes two or more path segments, the individual path segments may be of the same type or of different types. The types of path segments may include, for example, a line, an elliptic arc, a quadratic Bézier curve, and a cubic Bézier curve. In some examples, the path segment types may be defined in accordance with a standard vector graphics application programming interface (API), such as, e.g., the Open Vector Graphics (OpenVG) API.

Graphics processing units (GPUs) typically implement a three-dimensional (3D) graphics pipeline that is designed to be compliant with one or more 3D graphics APIs. Because the prevailing 3D graphics APIs in use today do not require that compliant devices (e.g., GPUs) support path rendering commands, modern GPUs often provide little to no hardware acceleration for path rendering commands. For example, a typical 3D graphics pipeline implemented in a modern GPU may include a rasterizer that is designed to rasterize low-order, non-curved, 3D graphics primitives (such as, e.g., points, lines and triangles), but may not be capable of directly rendering curved path rendering primitives (such as, e.g., elliptic arcs and Bézier curves).

One approach for path rendering may involve using a 3D GPU pipeline to provide partial GPU hardware acceleration for the execution of path rendering commands. This approach involves preprocessing a path segment with a central processing unit (CPU) in order to convert the path segment into one or more low-order, non-curved, graphics primitives that can be rasterized by the GPU. In examples other than those in accordance with the techniques described in this disclosure, a CPU may divide a curved path segment (e.g., an elliptical arc or a Bézier curve) into a set of relatively small triangles that approximates the curvature of the path segment, and may cause the set of triangles to be rendered using the GPU. Such an approach, however, may be CPU-intensive, and may therefore limit the amount of CPU processing cycles available for other CPU tasks. Moreover, in some cases, a relatively large amount of triangles may be needed to render the path segment at a desired level of detail. The relatively large amount of triangles may consume a significant amount of memory storage space when storing the data, and may consume a significant amount of memory bandwidth when transferring the data to the GPU.

The path rendering techniques in this disclosure may provide a GPU hardware-accelerated path rendering solution that utilizes a modified tessellator stage of a GPU and two rendering passes to determine domain coordinates for vertices of a primitive received by the modified tessellator stage. Subsequent stages in the graphics pipeline interpret the domain coordinates to perform path rendering operations to a line segment, such as applying dashing, and end caps to a path, as well as applying joins between the endpoints of interior path segments using a 3D graphics pipeline. By using the GPU to perform the path rendering operations, the burden of performing these operations is lifted from the CPU, thereby freeing up processing resources for other CPU tasks. Moreover, the GPU may, in some examples, utilize a highly-parallel, modern GPU tessellation architecture to aid in perform the path rendering operations, which may allow the GPU to render a path segment in a more efficient manner than the CPU.

In some examples, the GPU may be able to tessellate and render a path segment using a graphics architecture that is specified by a particular 3D graphics API, such as, e.g., the DirectX 11 API. As described in more detail, the techniques described in this disclosure describe possible modifications to the graphics hardware, and in particular the tessellation stage, to generate domain coordinates for vertices, which subsequent stages in the GPU graphics pipeline may interpret to perform rendering operations for end caps, dashing, joins, and cusp handling. In this manner, the techniques described in this disclosure allow for graphics hardware of the DirectX 11 architecture, with some modifications, to perform path rendering with dashing, joins, end caps, and re-tessellation.

Path rendering may be divided into two main operations: (1) filling a path segment; and (2) stroking a path segment. In some examples, one or both of the filling and stroking operations may be performed to completely render a path. Conceptually, the filling operation may correspond to filling the interior region of a path segment with a specified fill color. For purposes of illustration, the techniques are described with respect to the stroking operation. The filing operations may be performed any way.

The stroking operation may conceptually correspond to "widening" the edges of a path segment using a straight-line pen held perpendicularly to the path. In addition to the main operations, path rendering may also involve applying various types of dashing, end caps to the ends of a path, applying various types of joins between the endpoints of interior path segments of a path, and handling cusps using re-tessellation.

A GPU may tessellate (e.g., divide) a primitive or a path segment using a tessellation stage, also referred to as a "tessellation unit" or a tessellator. After the GPU tessellates the path segment, the GPU that implements the path rendering techniques of this disclosure may be configured to generate 3D geometry based on domain coordinates that the tessellator stage determines and outputs to subsequent stages in the GPU graphics rendering pipeline. By rendering stroke areas for a path segment based on the 3D geometry generated by the GPU, a 3D GPU pipeline may be used to provide either a 100% or a nearly 100% GPU solution for the execution of stroking operations.

FIG. 1 is a block diagram illustrating an example computing device 2 that may be used to implement the GPU-accelerated path rendering techniques of this disclosure. Computing device 2 may comprise a personal computer, a desktop computer, a laptop computer, a computer workstation, a tablet computing device, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a memory 10, a graphics processing unit (GPU) 12, a GPU cache 14, a display interface 16, a display 18 and bus 20. User interface 4, CPU 6, memory controller 8, GPU 12 and display interface 16 may communicate with each other using bus 20. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spreadsheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, a DirectX API, a RenderMan API, a WebGL API, OpenVG® or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, patches, etc. In further examples, the graphics data to be rendered may include one or more path rendering primitives, such as, e.g., line segments, elliptic arcs, quadratic Bézier curves, and cubic Bézier curves.

Memory controller 8 facilitates the transfer of data going into and out of memory 10. For example, memory controller 8 may receive memory read requests and memory write requests from CPU 6 and/or GPU 12, and service such requests with respect to memory 10 in order to provide memory services for the components in computing device 2. Memory controller 8 is communicatively coupled to memory 10. Although memory controller 8 is illustrated in the example computing device 2 of FIG. 1 as being a processing module that is separate from each of CPU 6, GPU 12, and memory 10, in other examples, some or all of the functionality of memory controller 8 may be implemented on one or more of CPU 6, GPU 12, and memory 10.

Memory 10 may store program modules and/or instructions that are accessible for execution by CPU 6 and/or data for use by the programs executing on CPU 6. For example, memory 10 may store user applications and graphics data associated with the applications. Memory 10 may also store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of path data, path segment data, surfaces, texture buffers, depth buffers, stencil buffers, vertex buffers, frame buffers, or the like. In addition, memory 10 may store command streams for processing by GPU 12. For example, memory 10 may store path rendering commands, 3D graphics rendering commands, and/or general-purpose GPU (GPGPU) computing commands. Memory 10 may include one or more volatile or non-volatile memories or storage devices, such as, for example, random access memory (RAM), static RAM (SRAM), dynamic RAM (DRAM), synchronous dynamic random access memory (SDRAM), read-only memory (ROM), erasable programmable ROM (EPROM), electrically erasable programmable ROM (EEPROM), Flash memory, a magnetic data media or an optical storage media.

GPU 12 may be configured to execute commands that are issued to GPU 12 by CPU 6. The commands executed by GPU 12 may include graphics commands, draw call commands, GPU state programming commands, memory transfer commands, general-purpose computing commands, kernel execution commands, tessellation commands, etc.

In some examples, GPU 12 may be configured to perform graphics operations to render one or more graphics primitives to display 18. In such examples, when one of the software applications executing on CPU 6 requires graphics processing, CPU 6 may provide graphics data to GPU 12 for rendering to display 18 and issue one or more graphics commands to GPU 12. The graphics commands may include, e.g., draw call commands, GPU state programming commands, conditional commands, memory transfer commands, blitting commands, tessellation commands, etc. The graphics data may include vertex data, texture data, surface data, etc. In some examples, CPU 6 may provide the commands and graphics data to GPU 12 by writing the commands and graphics data to memory 10, which may be accessed by GPU 12.

In further examples, GPU 12 may be configured to perform general-purpose computing, so-called general purpose GPU (GPGPU), for applications executing on CPU 6. In such examples, when one of the software applications executing on CPU 6 decides to off-load a computational task to GPU 12, CPU 6 may provide general-purpose computing data to GPU 12, and issue one or more general-purpose computing commands to GPU 12. The general-purpose computing commands may include, e.g., kernel execution commands, memory transfer commands, etc. In some examples, CPU 6 may provide the commands and general-purpose computing data to GPU 12 by writing the commands and graphics data to memory 10, which may be accessed by GPU 12.

GPU 12 may, in some instances, be built with a highly-parallel structure that provides more efficient processing of graphics operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 18 more quickly than rendering the images using CPU 6. In addition, the highly parallel nature of GPU 12 may allow GPU 12 to process certain types of vector and matrix operations for general-purposed computing applications more quickly than CPU 6.

GPU 12 may, in some examples, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within memory 10. The rendered image data may include rendered fill areas and stroke areas for a path segment to be rendered. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing.

Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computer device 2 via a wired or wireless communications link. For instance, display 18 may be a computer monitor or flat panel display connected to a personal computer via a cable or wireless link.

Bus 20 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 20 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

According to this disclosure, GPU 12 may be configured to provide partial-to-total GPU-hardware acceleration for the execution of various path rendering commands. For example, CPU 6 may issue one or more path rendering commands to GPU 12, and GPU 12 may execute the path rendering commands. As one example in accordance with the techniques of this disclosure, GPU 12 may include a tessellation unit configured to determine domain coordinates for vertices of a received primitive, output the determined domain coordinates for the vertices, determine, that a domain type for the received primitive is not one of tri, isoline, or quad domain, and output information indicative of a graphical feature associated with one or more of the determined domain coordinates when the domain type is not one of the tri, isoline, or quad domain. The concept of the tri, isoline, and quad domain, as well as the information indicative of the graphical features are all described in more detail below.

In some examples, GPU 12 may use a two-pass rendering approach to perform a path stroking operation. In a first pass, GPU 12 may determine domain coordinates for caps, and joins, and may divide a primitive into sub-segments. In a second pass, the tessellation unit may determine additional domain coordinates based on the domain coordinates determined in the first pass, and may perform graphical operations based on a dashing pattern, such as keeping or dropping segments based on the pattern. The domain coordinates that GPU 12 determines in the second pass may correspond to caps, joins, and handling cusps of for sub-segments that are specified according to the dashing pattern. In some examples, the tessellation unit of GPU 12 may also output information indicative of a graphical feature associated with one or more of the domain coordinates determined in the second pass. The information indicative of the graphical feature may indicate whether the domain coordinates are associated with start cap, end cap, join, or a line segment. A subsequent stage, such as a domain shader stage, may receive the domain coordinates a input and may determine vertex coordinates based on the domain coordinates.

As part of the stroking operation, and to generate one or more primitives (e.g., triangle primitives) that spatially correspond to a stroke area of a line segment, GPU 12 may receive a primitive, which may be defined by an equation, e.g., a parametric equation, etc. GPU 12 may divide the received primitive into one or more line segments utilizing the tessellation unit, in accordance with the techniques of this disclosure. In some examples, GPU 12 may generate a plurality of normal vectors for each endpoint of the line segments determined from the received primitive. Each of the normals correspond to a respective one of a plurality of points along the path segment.

Based on the domain coordinates that the tessellation unit of GPU 12 generates, GPU 12 may perform path rendering operations, such as cusp handling, adding start and end caps, adding dashing, and adding joins to line segments determined from the received primitive. GPU 12 may determine how to interpret the determined domain coordinates based on the information indicative of the graphical feature associated with the one or more determined domain coordinates.

In the techniques described in this disclosure, the graphical features associated with the one or more determined domain coordinates may assist in implementing the path rendering techniques in an efficient manner. For instance, examples of the graphical feature include information indicating whether the domain coordinates are for cusp handling, adding start and end caps, adding dashing, and adding joins, as few examples, although other examples of the graphical feature may exist and the techniques should not be considered so limiting. With graphical feature, GPU 12 may have already determined for what purpose the domain coordinate is to be used, which allows GPU 12, via the tessellation unit, to implement cusp handling, adding start and end caps, adding dashing, and adding joins in an efficient manner, as a few examples.

The path rendering techniques described in this disclosure may be implemented in any of the components of computing device 2 illustrated in FIG. 1 including, e.g., CPU 6, GPU 12, and memory 10. In some examples, all or almost all of the path rendering techniques may be implemented in GPU 12 (e.g., in a graphics pipeline of GPU 12). In additional examples, CPU 6 may implement techniques for configuring the state of the graphics pipeline and binding shader programs to the graphics pipeline to implement a path rendering pipeline in GPU 12 that performs the path rendering techniques of this disclosure. In further examples, CPU 6 may be configured to place data indicative of a path to be rendered into one or more buffers (e.g., one or more vertex buffers) that may be accessed by GPU 12 to render one or more paths.

Figure 2:
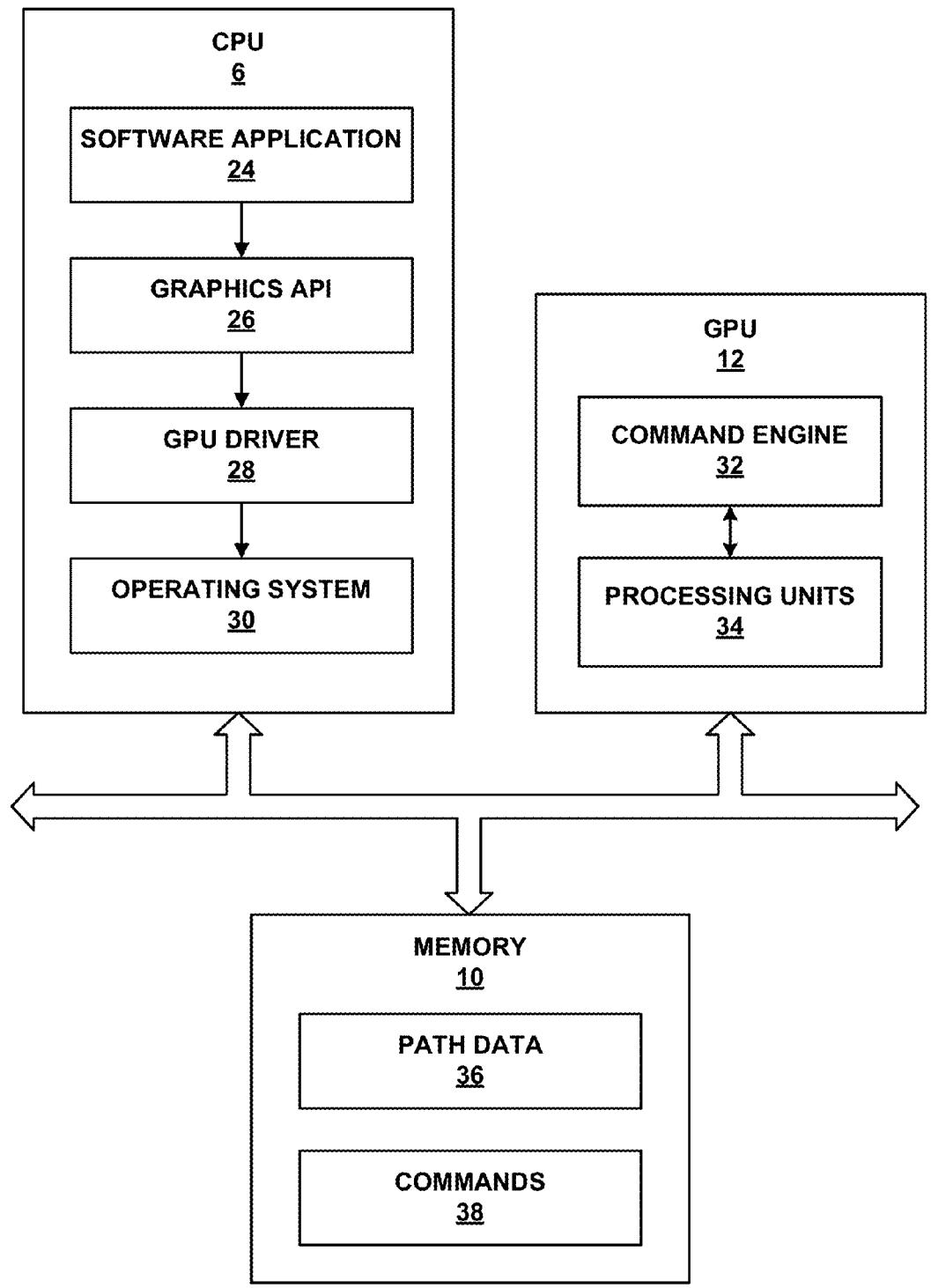
FIG. 2 is a block diagram illustrating the central processing unit (CPU), the graphics processing unit (GPU) and the memory of the computing device in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC).

CPU 6 is configured to execute software application 24, a graphics application processing interface (API) 26, a GPU driver 28 and an operating system 30. Software application 24 may include one or more instructions that cause graphics images to be displayed and/or one or more instructions that cause a non-graphics task (e.g., a general-purposed computing task) to be performed on GPU 12. Software application 24 may issue instructions to graphics API 26. Graphics API 26 may be a runtime service that translates the instructions received from software application 24 into a format that is consumable by GPU driver 28. GPU driver 28 receives the instructions from software application 24, via graphics API 26, and controls the operation of GPU 12 to service the instructions. For example, GPU driver 28 may formulate one or more commands 38, place the commands 38 into memory 10, and instruct GPU 12 to execute the commands 38. In some examples, GPU driver 28 may place the commands 38 into memory 10 and communicate with GPU 12 via operating system 30, e.g., via one or more system calls.

GPU 12 includes a command engine 32 and one or more processing units 34. In some examples, the one or more processing units 34 may form and/or implement a 3D graphics rendering pipeline, e.g., a DX 11 graphics rendering pipeline (i.e., a 3D graphics pipeline that is compliant with the DX 11 graphics API).

Command engine 32 is configured to receive commands from CPU 6 (e.g., via memory 10) and to cause GPU 12 to execute the commands. In response to receiving a state command, command engine 32 may be configured to set one or more state registers in GPU 12 to particular values based on the state command, and/or to configure one or more of the fixed-function processing units 34 based on the state command. In response to receiving a draw call command, command engine 32 may be configured to cause processing units 34 to render the geometry represented by vertices in memory 10 based on data indicative of the type of path to be rendered, which may be contained in the vertex data structures of the vertex buffers to be rendered. Command engine 32 may also receive shader program binding commands, and load particular shader programs into one or more of the programmable processing units 34 based on the shader program binding commands.

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed-function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, alpha blending, etc., as well as Memory 10 may store path data 36 and one or more commands 38. In some examples, path data 36 may be stored as a plurality of vertices (or control points) in one or more vertex buffers allocated in memory 10. In some examples, the path data may be stored in a patch list data structure (e.g., a four control point patch list). Commands 38 may be stored in one or more command buffers (e.g., a ring buffer). CPU 6 (e.g., GPU driver 28 via operating system 30) may place path data 36 and commands 38 into memory 10 for consumption by GPU 12. GPU 12 (e.g., command engine 32) may retrieve and execute commands 38 stored in memory 10.

In examples where path data 36 is stored as vertices, the vertices may include one or more attributes that geometrically define a path to be rendered. For example, for a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points instead of four control points. For elliptic arcs, the vertices in the patch control list may include data indicative of an endpoint parameterization of the elliptic arc or data indicative of a center parameterization of the elliptic arc.

In some cases, the one or more attributes that geometrically define the path to be rendered may be resolution-independent. In other words, the attributes that geometrically define the path may be independent of the amount of tessellation to be performed when rendering the path segment and/or independent of the amount of vertices to be generated when rendering the path segment.

CPU 6 may also place data indicative of the type of path to be rendered (i.e., a "path type indicator") into one or more otherwise unused vertex attributes in the vertex buffer. In some examples, the different path types may correspond to a set of path types that are defined by a vector graphics API and are available for use by software application 24. In some examples, the different path types may correspond to a set of path types that are defined by the OpenVG API.

Commands 38 may include one or more state commands and/or one or more draw call commands. A state command may instruct GPU 12 to change one or more of the state variables in GPU 12, such as, e.g., the draw color, the fill color, the stroke color, etc. In some examples, the state commands may include path rendering state commands that are configured to set one or more state variables associated with rendering a path. For example, the state commands may include a paint mode command that is configured to indicate whether a path to be rendered is to be filled, stroked, or both. As another example, the state commands may include a fill color command that specifies a color to be used for filling operations and/or a stroke color command that specifies a color to be used for stroking operations. As a further example, the state commands may specify one or more parameters for the stroke operation, such as, e.g., a stroke width, an end cap style (e.g., butt, round, square), a line join style (e.g., miter, round, bevel), a miter limit, etc. In some examples, in addition to or in lieu of using a state command to set one or more state parameters, one or more of the state parameters may be set by using a draw call command or by placing state indicators into a vertex buffer that contains path data 36.

A draw call command may instruct GPU 12 to render the geometry defined by a group of one or more vertices (e.g., defined in a vertex buffer) stored in memory 10. In some examples, the draw call command may invoke GPU 12 to render all of the vertices stored in a defined section (e.g., a vertex buffer or path data 36) of memory 10. In other words, once GPU 12 receives the draw call command, control is passed to GPU 12 for rendering the geometry and primitives represented by the vertices in the defined section (e.g., vertex buffer or path data 36) of memory 10.

The draw call commands may include one or both of 3D draw call commands and path rendering draw call commands. For 3D rendering draw call commands, the geometry defined by the group of one or more vertices in the vertex buffer may correspond to one or more 3D graphics primitives to be rendered (e.g., points, lines, triangles, quadrilaterals, triangle strips, patches, etc.), and the 3D rendering draw call command may instruct GPU 12 to render the one or more 3D graphics primitives. For path rendering draw call commands, the geometry defined by the group of one or more vertices in the vertex buffer may correspond to one or more path primitives to be rendered (e.g., line segments, elliptic arcs, quadratic Bézier curves, and cubic Bézier curves, etc.), and the path rendering draw call command may instruct GPU 12 to render the one or more path primitives.

The draw call may also specify one or more tessellation commands, which utilize fixed function and programmable units that may include a hull shader, tessellator, and a domain shader. The hull shader may specify a domain that is to be tessellated. In some examples, a domain to be tessellated may comprise one of an isoline, triangle (tri), or quad (quadrilateral) domain. The tessellator operates on the specified domain, and outputs domain coordinates, based on which, the domain shader may determine vertex coordinates. The techniques of this disclosure modify the tessellator such that the tessellator may operate on additional domain types, other than the isoline, tri, and quad domain types. The new domain types may affect the operations that the tessellation unit performs, and may cause the tessellator to output information indicative of a graphical feature to subsequent stages of GPU 12, such as a domain shader stage.

In some examples, the path rendering techniques described in this disclosure may be implemented in any of the components shown in FIG. 2 including, e.g., graphics API 26, GPU driver 28, command engine 32 and processing units 34. In some examples, all or almost all of the path rendering techniques may be implemented in a graphics pipeline in GPU 12 formed by processing units 34. For instance, the tessellation unit may be a unit of processing units 34. In additional examples, software application 24, graphics API 26 and/or GPU driver 28 of CPU 6 may implement techniques for configuring the state of the graphics pipeline and binding shader programs to the graphics pipeline to implement a path rendering pipeline in GPU 12 that performs the path rendering techniques of this disclosure. In further examples, software application 24, graphics API 26 and/or GPU driver 28 of CPU 6 may be configured to place data indicative of a path to be rendered into one or more buffers (e.g., one or more vertex buffers) that may be accessed by GPU 12 to render one or more paths.

In accordance with the techniques of this disclosure, GPU 12 may include a tessellation unit configured to determine domain coordinates for vertices of a received primitive, output the determined domain coordinates for the vertices, determine that a domain type for the received primitive is not one of tri, isoline, or quad domain, and output information indicative of a graphical feature associated with one or more of the determined domain coordinates when the domain type is not one of the tri, isoline, or quad domain.

Figure 3:
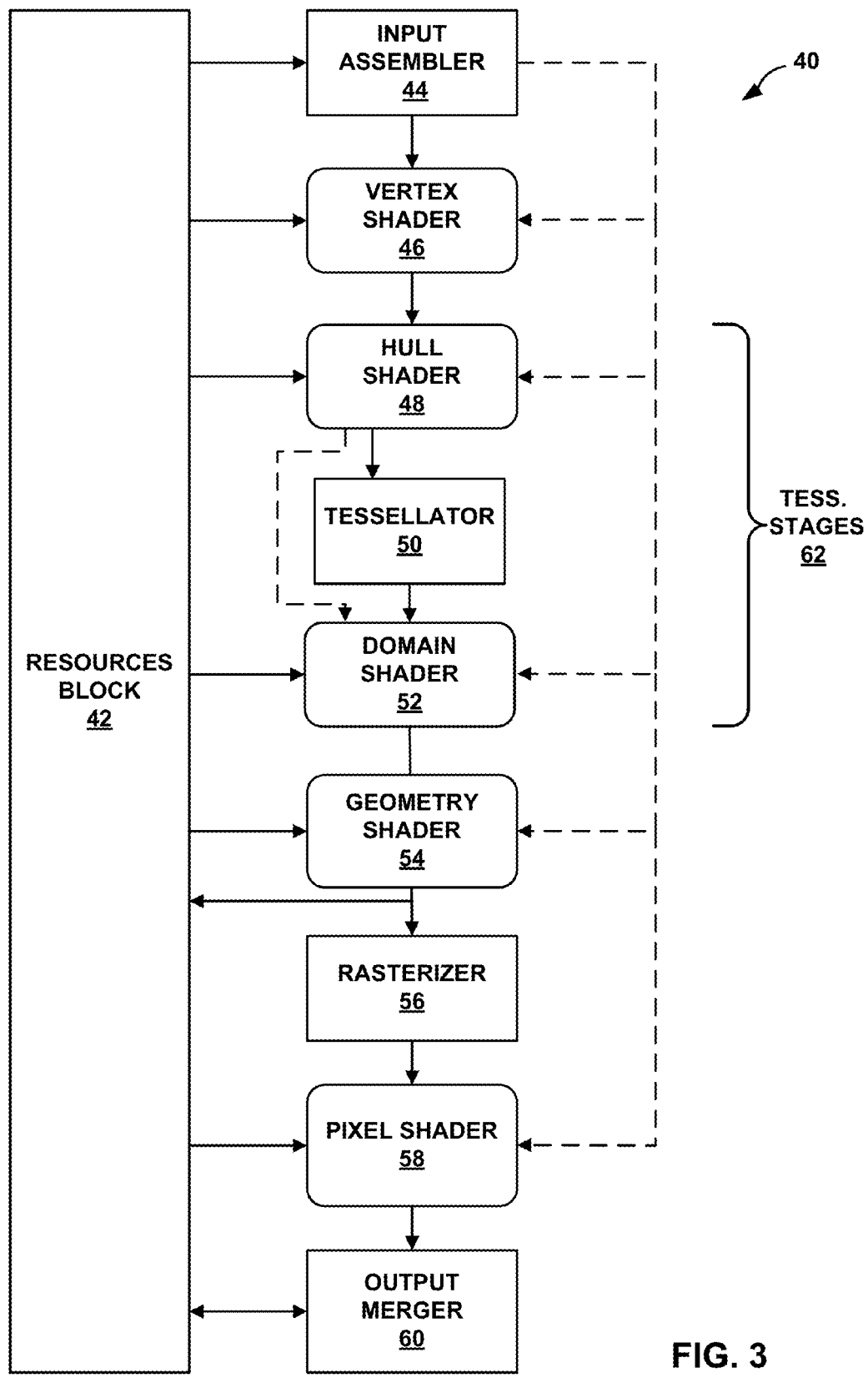
FIG. 3 is a conceptual diagram illustrating an example graphics pipeline that may perform the GPU-accelerated path rendering techniques of this disclosure.

FIG. 3 is a conceptual diagram illustrating an example graphics pipeline 40 that may perform the path rendering techniques of this disclosure. In some examples, the graphics pipeline may correspond to a Microsoft® DirectX (DX) 11 graphics pipeline. As shown in FIG. 3, graphics pipeline 40 includes a resources block 42 and a plurality of processing stages, which may comprise processing units 34 of FIG. 2. The plurality of processing stages (e.g. processing units 34) include an input assembler (IA) 44, a vertex shader (VS) 46, a hull shader (HS) 48, a tessellator 50, a domain shader (DS) 52, a geometry shader (GS) 54, a rasterizer 56, a pixel shader (PS) 58, and an output merger 60. Hull shader 48, tessellator 50, and domain shader 52 may form the tessellation stages 62 of graphics pipeline 40.

Resources block 42 may correspond to one or more memory resources used by graphics pipeline 40, such as, e.g., one or more textures and/or one or more buffers. Resources block 42 may store input data to be processed by one or more of the processing stages in graphics pipeline 40 and/or output data from one or more of the processing stages in graphics pipeline 40. As an example, resources block 42 may store a frame buffer that holds a rasterized version of a fill area for a path segment and/or a rasterized version of a stroke area for a path segment as described in this disclosure. In some examples, the memory resources that form resources block 42 may reside in memory 10 and/or GPU cache 14 of computing device 2.

The processing stages depicted in FIG. 3 with straight corners represent fixed-function processing stages, and the processing stages depicted in FIG. 3 with rounded corners represent programmable processing stages. For example, as shown in FIG. 3, input assembler 44, tessellator 50, rasterizer 56 and output merger 60 are fixed-function processing stages, and vertex shader 46, hull shader 48, domain shader 52, geometry shader 54 and pixel shader 58 are programmable processing stages. Each of the programmable stages may be configured to execute a shader program of a particular type. For example, vertex shader 46 may be configured to execute a vertex shader program, hull shader 48 may be configured to execute a hull shader program, etc. Each of the different types of shader programs may execute either on a common shader unit of the GPU or on one or more dedicated shader units that are dedicated to executing shader programs of one or more particular types.

As shown in FIG. 3, input assembler 44, vertex shader 46, hull shader 48, domain shader 52, geometry shader 54, pixel shader 58 and output merger 60 are communicatively coupled to resources block 42. Input assembler 44, vertex shader 46, hull shader 48, domain shader 52, geometry shader 54, pixel shader 58 and output merger 60 are configured to retrieve and/or to receive input data from resources block 42. Geometry shader 54 and output merger 60 are configured to write output data to resources block 42. The above-described configuration of communication between the processing stages in graphics pipeline 40 and resources block 42 is merely one example of how the communication may be configured between the processing stages of graphics pipeline 40 and resources block 42. In other examples, more or less unidirectional and/or bi-directional communication channels may be provided between the processing stages of graphics pipeline 40 and resources block 42.

Further information regarding the general operation of the DirectX 11 graphics pipeline may be found in Zink et al., "Practical Rendering & Computation with Direct3D 11," CRC Press (2011), the entire content of which is incorporated herein by reference.

As discussed above, the two main path rendering operations are: (1) filling a path segment; and (2) stroking a path segment. Solutions for performing stroking operations with graphics rendering pipeline 40 (e.g., the DirectX 11 graphics pipeline) will now be described.

CPU 6 may place data indicative of a path segment to be rendered into one or more vertices of a vertex buffer. In some examples, the vertex buffer may correspond to path data 36 shown in FIG. 2. The primitive topology for the vertices in the vertex buffer may be, in some examples, a patch control list. For a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points that define the curve instead of four control points. For elliptic arcs, the vertices in the patch control list may include data indicative of an endpoint parameterization of the elliptic arc or data indicative of a center parameterization of the elliptic arc. CPU 6 may also place data indicative of the type of path to be rendered into an otherwise unused vertex attribute of the patch control list.

One example format for the path data 36 received and used by GPU 12 to perform path rendering will now be described. It should be understood that this is merely one example of how data indicative of a path to be rendered may be provided by CPU 6 to GPU 12 and that other examples are possible and within the scope of this disclosure. In this example, GPU 12 receives each path segment as a four (4) control point patch list primitive. Each of the vertices (e.g., control points) in the patch list, in this example, includes three (3) float attributes that define attributes for the respective vertex (e.g., control point).

For a line path segment, the input path data may take the following form or a similar form:
 {XMFLOAT3(X0, Y0, 2.0f)},
 {XMFLOAT3(X1, Y1, 1.0f)}, {XMFLOAT3(0.0f, 0.0f, 1.0f)},
{XMFLOAT3(0.0f, 0.0f, 1.0f)}, In this example, each row represents a vertex or control point of a four control point patch, and each parameter in the parentheses represents an attribute of a respective vertex or control point. The last attribute for the first control point, in this example, stores data indicative of the type of path to be rendered (i.e., a "path type indicator"). Specifically, the path type indicator in this example is 2.0f, which means that the path segment is a line path segment. X0, Y0, X1, Y1 are the coordinates for the endpoints of the line path segment where (X0, Y0) represents a first endpoint and (X1, Y1) represents a second endpoint.

The remaining vertices and attributes in this example may be unused and/or may be used to indicate other attributes for the path segment. Other attributes for the path segment may include, e.g., whether the path segment is the beginning or end of an open path, whether the path segment should be displayed for the path, whether a start cap or an end cap be placed on either end of the path segment, what type of cap should be used if any, whether a join should be placed on either end of the path segment, and what type of join to use if any.

In general, hull shader 48 may determine control points, as well as an indication of a domain type. Tessellator 50 may receive the indication of the domain type from hull shader 48. In some examples, the tessellator may operate on an isoline, tri, or quad domain, as described above. Tessellator 50 may determine domain coordinates for the domain indicated by hull shader 48, and may output the determined domain coordinates to domain shader 52, which may determine vertex coordinates based on the domain coordinates output by tessellator 50.

When the attributes for path segments indicate that GPU 12 needs to implement joins, start or end caps, cusp handling, or dashing, tessellator 50 may be configured to determine domain coordinates for vertices of a received primitive, output the determined domain coordinates for the vertices, e.g., to domain shader 52, determine that a domain type for the received primitive is not one of tri, isoline, or quad domain, and output, e.g., to domain shader 52, information indicative of a graphical feature associated with one or more of the determined domain coordinates when the domain type is not one of the tri, isoline, or quad domain.

The input path data for a cubic Bézier path segment may take the following form or a similar form:

{XMFLOAT3(X0, Y0, 3.0f)},
{XMFLOAT3(X1, Y1, 1.0f)},
{XMFLOAT3(X2, Y2, 1.0f)},
{XMFLOAT3(X3, Y3, 1.0f)},

In this example, each row represents a vertex or control point of a four control point patch, and each parameter in the parentheses represents an attribute of a respective vertex or control point. The last attribute for the first control point, in this example, stores data indicative of the type of path to be rendered (i.e., a "path type indicator"). Specifically, the path type indicator in this example is 3.0f, which means that the path segment is a cubic Bézier path segment. X0-X3 and Y0-Y3 are the coordinates of the control points for the cubic Bézier path segment where (X0, Y0) represents a first control point, (X1, Y1) represents a second control point, etc. The remaining vertices and attributes in this example may be unused and/or may be used to indicate other attributes for the path segment. The other attributes for the path segment may be similar to those described above with respect to the line path segment.

Similar input may be used for a quadratic Bézier path segment except that three control points may be provided instead of four control points, and the primitive type indicator may be different to distinguish the primitive from a cubic Bézier path segment. For example, the input path data for a quadratic Bézier path segment may take the following form or a similar form:

{XMFLOAT3(X0, Y0, 1.0f)},
{XMFLOAT3(X1, Y1, 1.0f)},
{XMFLOAT3(X2, Y2, 1.0f)},
{XMFLOAT3(0.0f, 0.0f, 1.0f)},

In this example, each row represents a vertex or control point of a four control point patch, and each parameter in the parentheses represents an attribute of a respective vertex or control point. The last attribute for the first control point, in this example, stores data indicative of the type of path to be rendered (i.e., a "path type indicator"). Specifically, the path type indicator in this example is 1.0f, which means that the path segment is a quadratic Bézier path segment. X0-X2 and Y0-Y2 are the coordinates of the control points for the quadratic Bézier path segment where (X0, Y0) represents a first control point, (X1, Y1) represents a second control point, etc. The remaining vertices and attributes in this example may be unused and/or may be used to indicate other attributes for the path segment. The other attributes for the path segment may be similar to those described above with respect to the line path segment.

In some examples, the input path data for an elliptic arc path segment may include data indicative of a center parameterization of the elliptic arc path segment. For example, the input path data for an elliptic arc path segment may take the following form or a similar form:

{XMFLOAT3(X0, Y0, 4.0f)},
{XMFLOAT3(X1, Y1, 1.0f)},
{XMFLOAT3(c.x, c.y, 1.0f)},
{XMFLOAT3(angle1, 0.0f, angle2)}, In this example, each row represents a vertex or control point of a four control point patch, and each parameter in the parentheses represents an attribute of a respective vertex or control point. The last attribute for the first control point, in this example, stores data indicative of the type of path to be rendered (i.e., a "path type indicator"). The path type indicator, in this example may be any of 4.0, 4.1, 4.2 or 4.3 corresponding, respectively, to a large clockwise (LCW) elliptic arc, a large counter-clockwise (LCCW) arc, a small clockwise (SCW) elliptic arc, and a small counter-clockwise (SCCW) elliptic arc. X0, X1 and Y0, Y1 are endpoint coordinates of the elliptic arc path segment where (X0, Y0) represents an initial endpoint of the arc and (X1, Y1) represents a final endpoint of the arc. In addition, rH and rV represent horizontal and vertical radii, respectively, c.x and c.y are coordinates (c.x, c.y) that represent the center point of the ellipse of which the elliptic arc path segment is a part, angle1 represents the angle of the initial point of the elliptic arc (as measured on an unscaled circle), and angle2 represents the angle of the final point of the elliptic arc (as measured on an unscaled circle).

In some examples, CPU 6 may convert an elliptic arc represented in endpoint parametric form into a center parametric form prior to sending data indicative of the elliptic arc to GPU 12 for rendering. For example, CPU 6 may generate a center parameterization of an elliptic arc based on an endpoint parameterization of the elliptic arc, and send the center parameterization of the elliptic arc to GPU 12. The center parameterization for the elliptic arc may conform to the example input data form specified above. The center parameterization may be used by CPU 6 to find the endpoint tangents of the elliptic arc, which may in turn be used by CPU 6 to generate join primitives for rendering by GPU 12. Notably, even though the example input data form specified above is a center parameterization, the input data form may still include coordinates for the initial and final endpoints of the arc (i.e., (X0, Y0), (X1, Y1)). Such coordinates may be used, in some examples, to ensure water-tightness of the resulting geometry.

In further examples, the input path data for an elliptic arc path segment may include data indicative of an endpoint parameterization of the elliptic arc path segment. For example, the input path data for an elliptic arc path segment may take the following form or a similar form:

{XMFLOAT3(X0, Y0, 4.0f)},
{XMFLOAT3(X1, Y1, 1.0f)},
{XMFLOAT3(rH, rV, 1.0f)},
{XMFLOAT3(angle, 0.0f, 1.0f)}, In this example, each row represents a vertex or control point of a four control point patch, and each parameter in the parentheses represents an attribute of a respective vertex or control point. The last attribute for the first control point, in this example, stores data indicative of the type of path to be rendered (i.e., a "path type indicator"). The path type indicator, in this example may be any of 4.0, 4.1, 4.2 or 4.3 corresponding, respectively, to a large clockwise (LCW) elliptic arc, a large counter-clockwise (LCCW) arc, a small clockwise (SCW) elliptic arc, and a small counter-clockwise (SCCW) elliptic arc. X0, X1 and Y0, Y1 are endpoint coordinates of the elliptic arc path segment where (X0, Y0) represents an initial endpoint of the arc and (X1, Y1) represents a final endpoint of the arc. In addition, rH and rV represent horizontal and vertical radii, respectively, and angle represents the counter-clockwise rotation angle of the ellipse relative to the x axis measured prior to scaling by (rh, rv).

In some examples, stroking operations may use three additional fields on the vertex path data input to handle endcaps, joins and open paths. For example, certain vertex coordinates may store data indicative of whether the path segment is the beginning of an open path, the end of an open path, and whether the path segment may be dropped (e.g., the path segment is the closing path segment of an open path). The following is an example template that includes the above-described vertex attributes:

{XMFLOAT3(X0, Y0, 2.0f)},
{XMFLOAT3(X1, Y1, 2.0f)},
{XMFLOAT3(0.0f, 0.0f, 2.0f)},
{XMFLOAT3(0.0f, 0.0f, 2.0f)},

In this template, a 2.0f on the z coordinate (i.e. third coordinate or attribute) of the second vertex indicates that the path segment is the beginning of an open path and may signal to GPU 12 to put an endcap (i.e., a startcap) at the beginning of the path segment. A 2.0f on the z coordinate of the third vertex indicates that the path segment is the ending of an open path and may signal to GPU 12 to put an endcap at the end of the path segment. A 2.0f on the z coordinate of the last vertex indicates that the current primitive is to be dropped (e.g., it is the closing line or path segment of an open path).

To perform the path stroking operation, input assembler 44 obtains path data 36 from memory 10, and passes the path data onto subsequent stages of graphics pipeline 40 to render the path segments (e.g., path primitives) specified by path data 36. For example, input assembler 44 may obtain a plurality of vertices from a vertex buffer stored in memory 10 and cause vertex shader 46 to process the vertices. In some examples, input assembler 44 may pass the vertices to be processed directly to vertex shader 46. In additional examples, input assembler 44 may direct vertex shader 46 to retrieve particular vertices for processing from a vertex buffer in resources block 42.

Vertex shader 46 is configured to process vertices received from input assembler 44 and/or resources block 42 and to generate an output vertex for each input vertex processed by vertex shader 46. For example, for each input vertex, vertex shader 46 may execute an instance of a vertex shader program on a shader unit of GPU 12. The input vertices received by vertex shader 46 and the output vertices generated by vertex shader 46 may be alternatively referred to as input control points and output control points, respectively.

In further examples, vertex shader 46 may generate one or more output attributes for an output vertex that are not identical to the input attributes of a corresponding input vertex. For example, vertex shader 46 may perform substantive processing on one or more of the attributes of the input vertices to generate one or more attributes for the output vertices. As another example, vertex shader 46 may add and/or delete attributes from the set of input attributes to generate a set of output attributes for an output vertex.

Tessellation stages 62 (i.e., hull shader 48, tessellator 50, and domain shader 52) may tessellate the path segment defined by the input path data into a plurality of line segments. In some examples, tessellation stages 62 may receive a plurality of vertices that form a primitive, e.g., from vertex shader 46. In some examples, four vertices may comprise the primitive. Tessellation stages 62 may determine one or more domain coordinates based on the received primitive. The determined domain coordinates may approximate the curvature of the path to be rendered. In general, hull shader 48 may pass the control points received from vertex shader 46 to domain shader 52 for further processing, and provide configuration data, such as a domain type, to tessellator 50.

Tessellator 50 may determine domain coordinates at which one or more parametric equations that represent a particular type of path segment or primitive should be evaluated. In general, the techniques of this disclosure modify the behavior of tessellator 50 to include hardware that may operate on domains other than the tri, isoline, and quad domains described above. In some non-limiting examples, the new domains may be referred to as "path 1," and "path 2." When tessellator 50 receives an indication of the path 1 or path 2 domain, tessellator 50 may determine domain coordinates to support graphical operations, such as adding dashing, caps, joins, and handling cusps by smoothing cusp location using re-tessellation. When operating on the path 1 or path 2 domains, tessellator 50 may also output information indicative of a graphical feature. The information indicative of the graphical feature may be associated with at least one of the domain coordinates that tessellator 50 outputs. In order to operate on the new domains, tessellator 50 may include additional hardware, which may function in parallel with tessellator hardware of graphics pipeline 40. For the purposes of example, tessellator 50 is illustrated as one fixed function unit, though the hardware that supports the additional path types may be a separate hardware block in some instances.

Additionally, tessellator stages 62 may support two-pass tessellation. In the first pass, which may be indicated by hull shader 48 specifying the path 1 domain type, tessellator 50 may determine domain coordinates for a received primitive, output the determined domain coordinates and output information indicative of a graphical feature associated with one or more of the determined domain coordinates. In some examples, the information indicative of a graphical feature may indicate to subsequent stages in graphics pipeline 40 whether the determined domain coordinates are part of a start cap or end cap, a line segment, or a join. Based on this information of the graphical features, subsequent stage of the graphics pipeline may determine vertex coordinates for one or more primitives.

In the second pass, which may be indicated by hull shader 48 specifying the path 2 domain type, tessellator 50 may similarly determine domain coordinates based on information determined in the first tessellation pass. Subsequent stages of graphics pipeline 40 may also utilize the domain coordinates determined by tessellator 50, as well as the information indicative of the graphical feature to determine vertex coordinates for one or more primitives.

Domain shader 52 may evaluate the parametric equations at domain coordinates values determined by tessellator 50, and output a vertex for each evaluation. In some examples, each of the vertices output by domain shader 52 may include one or more attributes that are indicative of the position of the vertex. In additional examples, each of the vertices output by domain shader 52 may include one or more attributes that are indicative of the type of path rendering primitive associated with the vertex.

More specifically, hull shader 48 may process the control points received from vertex shader 46 and/or resources block 42 and may generate an output control for each instance of the hull shader program executed by hull shader 48. For example, for each output control point to be generated by hull shader 48, vertex shader 46 may execute an instance of a hull shader program on a shader unit of GPU 12.

In further examples, hull shader 48 may generate one or more output attributes for an output control point that are not identical to the input attributes of a respective one of the input control points. For example, hull shader 48 may perform substantive processing on one or more of the attributes of the input control points to generate one or more attributes for the output control points. As another example, hull shader 48 may add and/or delete attributes from a set of input attributes to generate the set of output attributes for an output vertex. In some examples, if GPU 12 receives path data for an elliptical arc that is in the form of an endpoint parameterization, hull shader 48 may convert the endpoint parameterization of the elliptical arc into a center parameterization for the elliptical arc as described in further detail below.

In further examples, hull shader 48 may drop primitives that are not to be rendered for a particular rendering operation. Dropping a primitive may refer to the process of causing data corresponding to the primitive to not be passed on to further stages of graphics pipeline, thereby effectively causing such a primitive to not be rendered by the remainder of the pipeline. For example, when graphics pipeline 40 is performing a filling operation, hull shader 48 may drop join primitives and cap primitives.

Hull shader 48 may also execute an instance of a patch constant function for each path segment. The patch constant function may determine and provide configuration parameters to tessellator 50 to be used by tessellator 50 when generating output values. For example, the patch constant function may cause hull shader 48 to provide tessellation factors to tessellator 50. The tessellation factors may specify a degree of tessellation that tessellator 50 is to apply to a particular tessellation domain (e.g., how finely the domain should be subdivided and/or the number of smaller objects into which the domain should be subdivided).

As another example, the patch constant function may cause hull shader 48 to provide a tessellation domain to tessellator 50. A tessellation domain may refer to an object that is used by tessellator 50 to generate a plurality of coordinates for use by tessellator 50. Conceptually, the tessellation domain may correspond to an object that is subdivided by tessellator 50 into a plurality of smaller objects. The positional coordinates of the vertices of the smaller objects are then sent to domain shader 52 for further processing. In some examples, the tessellation domain may be selected to be one of a quad, a tri, and an isoline. In some other examples, the domain may be selected to be one of the path 1 or the path 2 domain. The smaller objects into which the domain is subdivided, in some examples, may correspond to triangles, line segments, or points. The path 1 and path 2 domains may indicate that tessellator 50 is to perform operations to support dashing, cusps, caps, and joins, as well as to output information indicative of a graphical feature. In some examples, hull shader 48 may specify an isoline tessellation domain and specify that tessellator 50 should subdivide the isoline domain into line segments.

In accordance with the techniques of this disclosure, hull shader 48 may be configured to specify one of two additional domain types, referred to as "path 1" and "path 2," which are different from the quad, tri, and isoline described above. If hull shader 48 specifies path 1 as the domain type, tessellator 50 may interpret the tessellation factors received from hull shader 48 to include a segment tessellation factor, a start cap tessellation factor, a join tessellation factor, and an end cap tessellation factor. The segment tessellation factor, may indicate the number of line segments for the received primitive that tessellator 50 is to determine domain coordinates. The start cap tessellation factor and end cap tessellation factor may indicate the number of start cap or end cap segments for which tessellator 50 is to generate domain coordinates. Similarly, the join tessellation factor may indicate the number of sub-segments for which tessellator 50 is to generate domain coordinates when determining domain coordinates a join between two line segments.

If the domain type from hull shader 48 indicates that the domain is of path 2, hull shader 48 receives input from geometry shader 54, for example from a streamout buffer (within GPU cache 14 or memory 10). Based on this input, hull shader 48 generates tessellation factors for tessellation unit 50 to be used in second tessellation pass. This second pass receives tessellation factors generated by tessellator 50 in a first pass specified with domain type of path 1. However, tessellator 50 interprets the tessellation factors received from hull shader 48 differently than described above with respect to the path 1 domain type. When hull shader 48 specifies a domain type of path 2, tessellator 50 interprets the received tessellation factors from hull shader 48 to include a tessellation delta value, a length of segment value, an inverse length of segment value, and a primitive type value.

As described above, each endpoint of a line segment has an associated endpoint normal. If the endpoint normals of two connected line segments exceed a maximum angular deviation, tessellator 50 may determine additional domain coordinates corresponding to sub-segments. The endpoint normals associated with the additional domain coordinates have smaller angular deviations, which when rendered, may produce a curve with a smoother appearance, in some instances. Hull shader 48 maintains a maximum angular deviation as state, and from the maximum angular deviation, determines a tessellation factor, which tessellator 50 uses in conjunction with the tessellation delta value to determine the additional domain coordinates.

If a line segment has length greater than the tessellation delta value, tessellator 50 determines domain coordinates that correspond to sub-segments having length less than the tessellation delta value, which later stages of the GPU pipeline 40, e.g., domain shader 52 use to determine start and end points for each of the sub-segments. The additional domain coordinates generally correspond to vertices for the start and end points of the additional sub-segments. Tessellator 50 may also determine new normal vectors for each of the endpoints that correspond to the domain coordinates. To determine the domain coordinates and endpoint normals, tessellator 50 may perform linear interpolation, which is discussed in greater detail below.

When the domain type is specified as path 2, tessellator 50 may determine domain coordinates in accordance with a dashing pattern specified by one or more graphics commands. Tessellator 50 utilizes the segment value and the inverse segment length value when determining how to apply the dashing pattern to the line segments received. If the dashing pattern indicates that the control points being processed by tessellator 50 are "on," that is, the segments are to be rendered, then tessellator 50 determines coordinates corresponding to the vertices of the line segment that are to be rendered. If the line segment is "off," according to the dashing pattern, tessellator 50 may drop the line segment. When dropping line segments, tessellator 50 does not determine or output domain coordinates for the line segment such that subsequent stages will not determine vertex coordinates for the "off" line segment.

When operating under the path 2 domain, tessellator 50 also receives information indicative of a graphical feature, such as whether the domain corresponds to a start or end cap, join, or a line segment. In the case of dashing, if the information indicates that the domain is a start or end cap, then tessellator 50 may not determine additional domain coordinates for that cap. However, if the state of the dashing pattern indicates that the current domain is "off," tessellator 50 may drop the start and/or end caps of associated with the line segment.

In the case where tessellator 50 is operating on the path 1 or path 2 domain types, tessellator 50 may generate domain coordinates that correspond to vertices for a start or end cap. To generate the start or end cap domain coordinates, tessellator 50 linearly interpolates domain coordinates based on start and end cap tessellation factors, which are either received, in the case of the path 1 domain type, or stored as state in the case of the path 2 domain type. After determining the domain coordinates for the start and end caps, tessellator 50 may output the domain coordinates, and may also output information indicating that at least one of the domain coordinates are of a start or end cap type.

Tessellator 50 may generate also plurality of output values for each path segment processed by tessellation stages 62. The output values may determine the values at which one or more parametric equations that represent a particular type of path segment should be evaluated by domain shader 52. In some examples, tessellator 50 may generate the plurality of output values based on one or more tessellation factors and/or a tessellation domain provided to tessellator 50 by hull shader 48. For example, tessellator 50 may subdivide an isoline into a plurality of line segments, and generate an output value for each endpoint of the plurality of line segments in a normalized coordinate system.

Domain shader 52 may receive domain coordinates and information indicative of one or more graphical features from tessellator 50 and the control points for a path segment, tessellation factors and a starting normal of the subsequent primitive, from hull shader 48. Based on these inputs, domain shader 52 generates output vertex coordinates, endpoint normals that correspond to the vertex represented by the coordinates, and an indication of the graphical feature associated with the vertex. As described above, the indication of the graphical feature may indicate that the vertex is part of a start or end cap, a line segment, or a join. For example, for each output value received from tessellator 50, domain shader 52 may execute an instance of a domain shader program on a shader unit of GPU 12. The domain shader program may cause domain shader 52 to evaluate one or more parametric equations at a particular value that is determined based on the particular value received from tessellator 50, and to generate coordinates for an output vertex based on the evaluations, as well as the graphical feature associated with each vertex coordinate. One or more of the coefficients of the parametric equations used to generate the output vertex coordinates may be defined based on one or more of the control points received from hull shader 48. Each output vertex may correspond to an endpoint of one of the plurality of tessellated line segments. Two consecutive output vertices may correspond to the endpoints of a single tessellated line segment. In additional examples, the domain shader program may cause domain shader 52 to evaluate one or more additional parametric equations at a particular value that is determined based on the particular value received from tessellator 50 in order to generate normal coordinates for each output vertex.

Domain shader 52 may output the vertices in an ordered sequence where each set of adjacent vertices represents a tessellated line segment. The line segments may collectively approximate the path segment that was defined in the vertex buffer. For example, domain shader 52 may output the following set of vertices {0, 1, 2, 3, 4, 5} that define the following line segments: {0, 1}, {1, 2}, {2, 3}, {3, 4}, {4, 5}. In additional examples, domain shader 52 may output the following set of vertices {0, 1, 1, 2, 2, 3, 3, 4, 4, 5} that may define the same line segments as listed in the previous example.

In some examples, tessellator 50 and domain shader 52 may be configured to uniformly tessellate a path segment into a plurality of line segments according to the following technique. Specifically, tessellator 50 may output coordinates for parametric evaluation (e.g., t=0/T, 1/T, 2/T . . . T/T, where T is the tessellation factor). Depending on the type of primitive, domain shader 52 may evaluate one or more parametric equations at the values that are output by tessellator 50.

For a line, T may, in some examples, be always equal to 1. In such examples, domain shader 52 may not necessarily need to perform any evaluation to generate vertices that correspond to the line path segment.

For a cubic Bézier curve, domain shader 52 may evaluate the curve and generate output vertices according to the following parametric equation:

$$V(t)=C0*(1-t)^3+C1*3*(1-t)^2*t+C2*3*(1-t)*t^2+C3*t^3 \quad (1)$$

where t corresponds to an output value provided by tessellator 50, V(t) corresponds to an output vertex that is generated for a particular output value (i.e., t), and C0, C1, C2, C3 correspond to the control points for the cubic Bézier curve.

Alternatively, for the cubic Bézier curve, domain shader 52 may evaluate the curve and generate output vertices according to the following parametric equations:

$$x(t)=X0*(1-t)^3+X1*3*(1-t)^2*t+X2*3*(1-t)*t^2+X3*t^3 \quad (2)$$

$$y(t)=Y0*(1-t)^3+Y1*3*(1-t)^2*t+Y2*3*(1-t)*t^2+Y3*t^3 \quad (3)$$

where t corresponds to an output value provided by tessellator 50, x(t) corresponds to the x-coordinate of an output vertex that is generated for a particular output value (i.e., t), y (t) corresponds to the y-coordinate of the output vertex that is generated for the particular output value (i.e., t), and (X0,Y0), (X1,Y1), (X2,Y2), (X3,Y3) correspond to the control points for the cubic Bézier curve.

For a quadratic Bézier curve, domain shader 52 may evaluate the curve and generate output vertices according to the following parametric equation:

$$V(t)=C0*(1-t)^2+C1*2*(1-t)*t+C2*t^2 \quad (4)$$

where t corresponds to an output value provided by tessellator 50, V(t) corresponds to an output vertex that is generated for a particular output value (i.e., t), and C0, C1, C2 correspond to the control points for the quadratic Bézier curve.

Alternatively, for the quadratic Bézier curve, domain shader 52 may evaluate the curve and generate output vertices according to the following parametric equations:

$$x(t)=X0*(1-t)^2+X1*(1-t)*t+X2*t^2 \quad (5)$$

$$y(t)=Y0*(1-t)^2+Y1*(1-t)*t+Y2*t^2 \quad (6)$$

where t corresponds to an output value provided by tessellator 50, x(t) corresponds to the x-coordinate of an output vertex that is generated for a particular output value (i.e., t), y(t) corresponds to the y-coordinate of the output vertex that is generated for the particular output value (i.e., t), and (X0,Y0), (X1,Y1), (X2,Y2) correspond to control points for the quadratic Bézier curve.

For an elliptic arc path segment, domain shader 52 may evaluate the curve and generate output vertices according to the following parametric equations:

$$x=Center_x+rh\ Cos*cos(angle_t)-rv\ Sin*sin(angle_t) \quad (7)$$

$$y=Center_y+rh\ Sin*cos(angle_t)+rv\ Cos*sin(angle_t) \quad (8)$$

where the parameterization angle $angle_t$ is determined from tessellator output t, x corresponds to the x-coordinate of an output vertex that is generated for a particular parameterization angle (i.e., $angle_t$), y corresponds to the y-coordinate of the output vertex that is generated for the parameterization angle (i.e., $angle_t$), rh represents the horizontal radius of the unrotated ellipse, ry represents the vertical radius of the unrotated ellipse, rv Cos, rv Sin, rh Cos and rh Sin represent ry*Cos(angle), ry*Sin(angle), rh*Cos(angle) and rh*Sin(angle), respectively, and angle represents the counter-clockwise angle of the ellipse relative to the x axis measured prior to scaling by (rh, rv). In some examples, hull shader 48 may be configured to determine (e.g., precompute) cos(angle) and sin(angle) and/or to determine (e.g., precompute) the rv Cos, rv Sin, rh Cos and rh Sin values, and to provide these values to domain shader 52 for use in evaluating the above-recited parametric equations for elliptic arcs.

As discussed above with respect to elliptic arcs, the vertices in the patch control list, in some examples, may include data indicative of an endpoint parameterization for the elliptic arc. In such examples, hull shader 48 (e.g., a hull shader program executing on a shader unit of GPU 12) may be used to convert the data indicative of an endpoint parameterization of the elliptic arc to data indicative of a center parameterization of the elliptic arc.

An example technique for finding the correct center of an ellipse when converting an endpoint parameterization of an elliptic arc to a center parameterization of the elliptic arc is now described. The example technique may determine a center point (cx, cy) and the initial and final angles θ1 and θ2 of an ellipse and/or elliptic arc based on an endpoint representation of an ellipse defined by the set of parameters (x0, y0), (x1, y1), rh, rv, φ, $f_S$, and $f_A$. An ellipse with center point (cx, cy), radii rh and rv, and rotation angle rot may satisfy the implicit equation $(x')^2+(y')^2=1$, where x'=((x−cx)*cos(rot)+(y−cy)*sin(rot))/rh and y'=(−(x−cx)*sin(rot)+(y−cy)*cos(rot))/rv. The transformation from (x, y) to (x', y') maps the desired ellipse into a unit circle centered at the origin.

To determine the center points of the pair of ellipses with common radii and rotation angle that pass through the two given points $(x_0, y_0)$ and $(x_1, y_1)$, a plane is first transformed into a suitably scaled and rotated coordinate system such that the equation of each ellipse becomes $(x'-cx')^2+(y'-cy')^2=1$. Then the centers (i.e., $(cx_0', cy_0')$ and $(cx_1', cy_1')$) of the two unit circles whose circumferences pass through two given points may be found. Finally, the center points are placed through an inverse transformation to obtain solutions in the original coordinate system.

The center points of the two unit circles that pass through points $(x_0, y_0)$ and $(x_1, y_1)$ are given by $(x_m \pm \Delta y*d, y_m \mp \Delta x*d)$, where $x_m=(x_0+x_1)/2$, $y_m=(y_0+y_1)/2$, $\Delta x=(x_0-x_1)$, $\Delta y=(y_0-y_1)$, and $d=\sqrt{(1/(\Delta x^2+\Delta y^2)-1/4.)}$. If d is infinite or imaginary, no solution exists due to the input points being coincident or too far apart, respectively. The angles θ1 and θ2 may be found by finding the slope of the endpoints on the circle and computing arctangents.

The following pseudo-code illustrates the process of computing ellipse centers according to the above-described technique. The findUnitCircles function is called by findEllipses following inverse transformation of the original ellipse parameters.

```
/* Given: Points (x0, y0) and (x1, y1)
 * Return: TRUE if a solution exists, FALSE otherwise
 * Circle centers are written to (cx0, cy0) and (cx1, cy1)
 */
static VGboolean findUnitCircles(double x0, double y0,
                double x1, double y1,
                double *cx0, double *cy0,
                double *cx1, double *cy1)
{
    /* Compute differences and averages */
    double dx = x0 − x1;
    double dy = y0 − y1;
    double xm = (x0 + x1)/2;
    double ym = (y0 + y1)/2;
    double dsq, disc, s, sdx, sdy;
    /* Solve for intersecting unit circles */
    dsq = dx*dx + dy*dy;
    if (dsq == 0.0) return VG_FALSE; /* Points are coincident
*/
    disc = 1.0/dsq − 1.0/4.0;
    if (disc < 0.0) return VG_FALSE; /* Points are too far
apart */
    s = sqrt(disc);
    sdx = s*dx;
    sdy = s*dy;
    *cx0 = xm + sdy;
    *cy0 = ym − sdx;
    *cx1 = xm − sdy;
    *cy1 = ym + sdx;
    return VG_TRUE;
}
/* Given: Ellipse parameters rh, rv, rot (in degrees),
 * endpoints (x0, y0) and (x1, y1)
 * Return: TRUE if a solution exists, FALSE otherwise
 * Ellipse centers are written to (cx0, cy0) and (cx1, cy1)
 */
VGboolean findEllipses(double rh, double rv, double rot,
                double x0, double y0, double x1, double
y1,
                double *cx0, double *cy0, double *cx1,
double *cy1)
{
    double COS, SIN, x0p, y0p, x1p, y1p, pcx0, pcy0, pcx1,
pcy1;
    /* Convert rotation angle from degrees to radians */
    rot *= M_PI/180.0;
    /* Pre-compute rotation matrix entries */
    COS = cos(rot); SIN = sin(rot);
    /* Transform (x0, y0) and (x1, y1) into unit space */
    /* using (inverse) rotate, followed by (inverse) scale */
    x0p = (x0*COS + y0*SIN)/rh;
```

-continued

```
    y0p = (-x0*SIN + y0*COS)/rv;
    x1p = (x1*COS + y1*SIN)/rh;
    y1p = (-x1*SIN + y1*COS)/rv;
    if (!findUnitCircles(x0p, y0p, x1p, y1p,
    &pcx0, &pcy0, &pcx1, &pcy1)) {
        return VG_FALSE;
    }
    /* Transform back to original coordinate space */
    /* using (forward) scale followed by (forward) rotate */
    pcx0 *= rh; pcy0 *= rv;
    pcx1 *= rh; pcy1 *= rv;
    *cx0 = pcx0*COS - pcy0*SIN;
    *cy0 = pcx0*SIN + pcy0*COS;
    *cx1 = pcx1*COS - pcy1*SIN;
    *cy1 = pcx1*SIN + pcy1*COS;
    return VG_TRUE;
}
```

Further details regarding converting an endpoint parameterization of an elliptic arc to a center parameterization of the elliptic arc may be found in the "OpenVG Specification, Version 1.1," Section 18.4, Dec. 3, 2008, available at: http://www.khronos.org/registry/vg/specs/openvg-1.1.pdf, the entire content of which is incorporated herein by reference.

Geometry shader 54 may receive tessellated line segments from domain shader 52 and generate a plurality of triangle primitives based on the tessellated line segments. For example, for each of the tessellated line segments, geometry shader 54 may execute an instance of a geometry shader program on a shader unit of GPU 12, and generate a triangle primitive for the tessellated line segment based on the respective tessellated line segment. In some examples, for each of the tessellated line segments, geometry shader 54 may receive two vertices from domain shader 52 that correspond to the respective tessellated line segment, and generate a set of three vertices that correspond to a triangle primitive.

In some examples, two of the vertices of the triangle primitive may be the same vertices (e.g., have the same positional coordinates) as the two received vertices. In such examples, geometry shader 54 may generate the third vertex based on a common vertex that is common for all tessellated line segments associated with a path segment to be rendered. The common vertex may or may not correspond to one of the endpoints of the tessellated line segments. In some examples, the common vertex may correspond to the first vertex in a set of vertices that correspond to the tessellated line segments for a path segment to be rendered. In some examples, geometry shader 54 may also be configured to output additional tessellation factors to tessellator 50 and re-tessellation/dashing unit 51 in accordance with the techniques of this disclosure Geometry shader 54 may be invoked once for each of the tessellated line segments produced by domain shader 52. For each of the tessellated line segments, geometry shader 54 may generate a triangle primitive using a common control point as a first vertex of the triangle and using the two endpoints of the respective tessellated line segment as the second and third vertices of the triangle. For example, an example was provided above where domain shader 52 generated the following set of vertices {0, 1, 2, 3, 4, 5} that define the following line segments: {0, 1}, {1, 2}, {2, 3}, {3, 4}, {4, 5}. For the above-listed sequence of line segments, geometry shader 54 may generate the following triangles: {C, 0, 1}, {C, 1, 2}, {C, 2, 3}, {C, 3, 4}, {C, 4, 5}, {C, 4, 5} where is any single vertex that is common to all of the triangles.

In some examples, geometry shader 54 may also be configured to "stream out" output data back to resources block 42. Graphics pipeline 40 may transmit the streamed out data back to hull shader 48, and domain shader 52 in some examples, in order to perform second tessellation pass in accordance with the techniques of this disclosure. The second tessellation pass may operate on the path 2 domain type.

Rasterizer 56 may be configured to convert a plurality of 3D graphics primitives (e.g., points, lines, and triangles) into a plurality of pixels that correspond to the 3D graphics primitives. For example, rasterizer 56 may receive three vertices that correspond to a triangle primitive, and convert the three vertices into a plurality of pixels that correspond to the screen pixel locations that are covered by the triangle primitive. Screen pixel locations that are covered by the triangle primitive may include screen pixel locations that correspond to the vertices of the triangle, the edges of the triangle, and the interior of the triangle.

Pixel shader 58 may receive pixels from rasterizer 56, and generate shaded pixels based on the received pixels according to a pixel shader program. For example, for each pixel received from rasterizer 56, pixel shader 58 may execute an instance of a pixel shader program on a shader unit of GPU 12.

In further examples, pixel shader 58 may generate one or more output attributes for an output pixel that are not identical to the input attributes of a respective one of the input pixels. For example, pixel shader 58 may perform substantive processing on one or more of the attributes of an input pixel to generate one or more attributes for an output pixel. As another example, pixel shader 58 may add and/or delete attributes from a set of input attributes to generate the set of output attributes for an output pixel.

Output merger 60 may place pixel data received from pixel shader 58 into a render target (e.g., a frame buffer or a stencil buffer). In some examples, output merger 60 may merge the pixel data received from pixel shader 58 with the pixel data already stored in a render target based on a raster operation.

In addition to domain shader 52 evaluating parametric equations to generate positional coordinates for vertices, domain shader 52 may also generate normals, e.g., tangents, for the vertices during the stroking operation. To generate the normals, domain shader 52 may evaluate additional parametric equations for each of the values generated by tessellator 50, and output one or more normals for each evaluation. In some cases, the normals may be output as attributes of a vertex that is output by domain shader 52. For example, for the stroking operation, an output vertex produced by domain shader 52 may include one or more attributes that are indicative of the position of the vertex, one or more attributes that are indicative of a normal or tangent associated with the vertex, and information indicative of a graphical feature associated with the vertex. The normal attributes may be indicative of a normal vector for a point on the path segment that corresponds to the parameter value generated by tessellator 50. For line segments, the normal may be obtained by taking the vector difference between the end point and the starting point of the line segment (e.g., (X1-X0, Y1-Y0)).

To generate the normals for curved path segments (e.g., Bézier curves and elliptic arcs), the tangent formulae for the curved path segments may be used. In general, the tangent formulae for curves and elliptic arcs (which may be used to determine the normals) are the derivatives of the parametric formulas described above with respect to generating the vertices for the curves and arcs.

For example, for a cubic Bézier curve, domain shader 52 may generate normals for the output vertices of the curve according to the following parametric equation:

$$N(t) = C0 * -3*(1-t)^2 + C1*(-6*(1-t)*t + 3*(1-t)^2) + C2* (-3*t^2 + 6*(1-t)*t) + C3*3*t^2 \quad (9)$$

where t corresponds to an output value provided by tessellator 50, N (t) corresponds to an output normal that is generated for a particular output value (i.e., t), and C0, C1, C2, C3 correspond to the control points for the cubic Bézier curve. A derivative of the parametric equation for the quadratic Bézier curve provided above may be used to generate normals for a quadratic Bézier curve in a similar fashion.

Alternatively, for the cubic Bézier curve, domain shader 52 may generate normals for the output vertices of the curve according to the following parametric equations:

$$x(t) = X0*-3*(1-t)^2 + X1*(-6*(1-t)*t+3*(1-t)^2) + \\ X2*(-3*t^2+6*(1-t)*t)+X3*3*t^2 \quad (10)$$

$$y(t) = Y0*-3*(1-t)^2 + Y1*(-6*(1-t)*t+3*(1-t)^2) + \\ Y2*(-3*t^2+6*(1-t)*t)+Y3*3*t^2 \quad (11)$$

where t corresponds to an output value provided by tessellator 50, x(t) corresponds to the x-coordinate of an output normal that is generated for a particular output value (i.e., t), y (t) corresponds to the y-coordinate of the output normal that is generated for the particular output value (i.e., t), and (X0,Y0), (X1,Y1), (X2,Y2), (X3,Y3) correspond to the control points for the cubic Bézier curve. A derivative of the parametric equations for the quadratic Bézier curve provided above may be used to generate normals for a quadratic Bézier curve in a similar fashion.

For an elliptic arc path segment, domain shader 52 may generate normals for the output vertices of the curve according to the following parametric equations:

$$\text{Tan}_x = -rh\, \text{Cos}*\sin(\text{angle}_t) - rv\, \text{Sin}*\cos(\text{angle}_t) \quad (12)$$

$$\text{Tan}_y = -rh\, \text{Sin}*\sin(\text{angle}_t) + rv\, \text{Cos}*\cos(\text{angle}_t) \quad (13)$$

where the parameterization angle, $\text{angle}_t$, is determined from tessellator output (i.e., t), $\text{Tan}_x$ corresponds to the x-coordinate of an output normal that is generated for a particular parameterization angle (i.e., $\text{angle}_t$), $\text{Tan}_y$ corresponds to the y-coordinate of the output normal that is generated for the parameterization angle (i.e., $\text{angle}_t$), rh represents the horizontal radius of the unrotated ellipse, ry represents the vertical radius of the unrotated ellipse, rv Cos, rv Sin, rh Cos and rh Sin represent rv*Cos(angle), rv*Sin(angle), rh*Cos(angle) and rh*Sin(angle), respectively, and angle represents the counter-clockwise angle of the ellipse relative to the x axis, measured prior to scaling by (rh, rv). In some examples, hull shader 48 may be configured to determine (e.g., precompute) cos(angle) and sin(angle) and/or to determine (e.g., precompute) the rv Cos, rv Sin, rh Cos and rh Sin values, and to provide these values to domain shader 52 for use in evaluating the above-recited parametric equations for ellipses.

After finding the tangent, the normal vector may be found according to the following equation:

$$\text{normal} = \text{normalize}(-\text{Tan}_y, \text{Tan}_x) \quad (14)$$

where normal corresponds to a normalized vector for the ($\text{Tan}_x$, $\text{Tan}_y$) vector, and normalize(x,y) is a function that generates a normalized version of an input vector (x,y). A normalized version of the vector (x,y) may refer to a vector that has the same direction as vector (x,y) and a length (e.g., norm) of one.

As discussed above with respect to elliptic arcs, the vertices in the patch control list may, in some examples, include data indicative of an endpoint parameterization. In such examples, hull shader 48 may convert the data indicative of an endpoint parameterization of the elliptic arc to data indicative of a center parameterization of the elliptic arc.

Figure 4A:
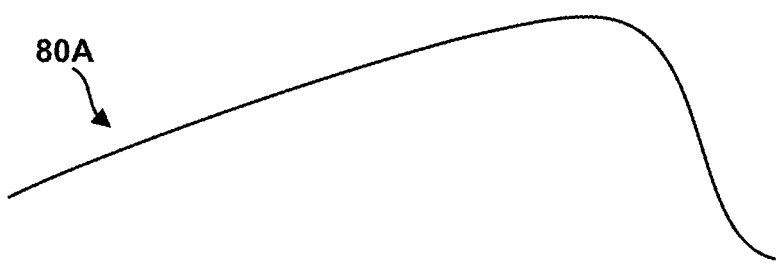
FIGS. 4A-4B are conceptual diagrams illustrating tessellating a received primitive in accordance with the techniques of this disclosure.
Figure 4B:
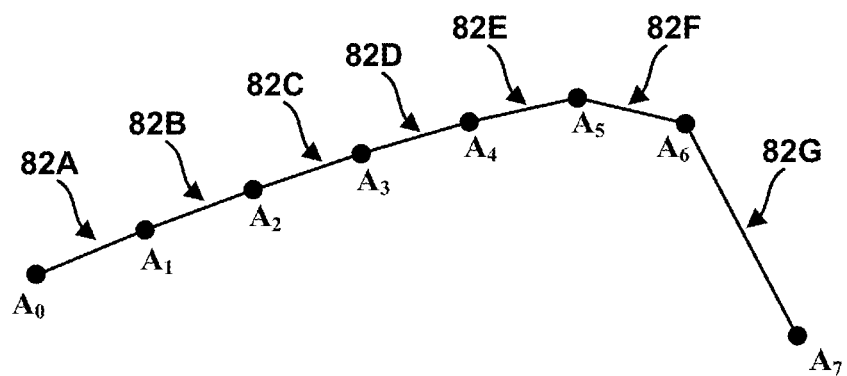

FIGS. 4A-4B are conceptual diagrams illustrating tessellating a received primitive in accordance with the techniques of this disclosure. FIG. 4A illustrates a curve 80A, such as a Bézier curve, or another type of curve defined by an equation, as described above. In accordance with the techniques of this disclosure, GPU 12, and in particular tessellation stages 62 may divide curve 80A into a plurality of line segments. Each line segment is defined by a start point and an end point.

FIG. 4B illustrates a curve the result of tessellating curve 80 into a plurality of line segments in accordance with the techniques of this disclosure. As noted above, hull shader 48 may determine tessellation factors, which tessellator may receive as input. Tessellator 50 may use the tessellation factors received as input to determine a plurality of domain coordinates for the received primitive, curve 80A, in this example.

In some examples, the tessellation factor may define a number of line segments that the primitive is to be divided into. In the example of FIG. 4B, curve 80A has been divided into seven line segments, denoted as line segments 82A-82G. Based on the received line segments tessellation factor, tessellation factor determines domain coordinates for seven line segments illustrated in FIG. 4B.

Tessellator 50 determines the domain coordinates for line segments 82A-82G in a u-v coordinate system. The line segments have start and end points $A_0$-$A_7$. In general, the u-v coordinate system is normalized from [0 . . . 1] on both the u-axis and the v-axis. The u-coordinate may indicate a horizontal position along the u-axis, and the v-coordinate may indicate a vertical position along the v-axis. However, in the instance where tessellator 50 determines domain coordinates for a curve for the purpose of dividing the curve into sub-segments, as illustrated in FIG. 4B, tessellator 50 only computes u-coordinates for each start point and end point of each line segment. Later stages, of graphics pipeline 40, such as domain shader 52 may determine any vertical offset associated with the line segments residing along curve 82A.

As noted above, the u-v coordinate system runs from zero to one. Accordingly, the start point of the first line segment, $A_0$, always has a u-coordinate of zero, and the end point of the last line segment, in this example $A_7$, always has a u-coordinate of one. In order to determine each u-coordinate along curve 82A, tessellator 50 linearly interpolates each u-coordinate based on the determined number of line segments. In the example of FIG. 4B then, $A_1$ has a u-coordinate value of 1/7 (0.14285 . . . ), the third line point, $A_2$, has a u-coordinate value of 2/7 (0.285714 . . . ), etc. In some examples, tessellator 50 may output the start point of a line segment, followed by the end point of the line segment. Tessellator 50 then outputs the start point of the subsequent line segment.

In addition to determining the domain coordinates, i.e., the u- and v-coordinates, for each of the start and endpoints along each of the line segments of curve 80A, tessellator 50 may also output information indicative of a graphical feature associated with one or more of the determined domain coordinates. In the example of FIG. 4B, where the end point u-coordinate of one line segments is the same as the start point u-coordinate of the line segment, the same u-coordinate is outputted twice, once corresponding to the end point of the previous line segment, and once corresponding to the start point of the subsequent line segment.

Figure 5A:
FIGS. 5A-5B are conceptual diagrams illustrating re-tessellation of line segments in accordance with the techniques of this disclosure.
Figure 5B:
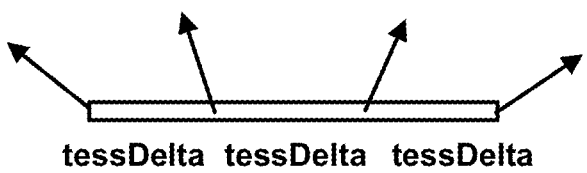

FIGS. 5A-5B are conceptual diagrams illustrating re-tessellation of line segments in accordance with the techniques of this disclosure. As described above with respect to FIG. 5, tessellator 50 may perform re-tessellation in some examples.

In the first pass illustrated in FIG. 5, tessellator 50 may divide the path into line segments. However, the endpoint normals of some adjacent (i.e. connected) line segments may exceed some maximum angular deviation relative to each other. Hull shader 48 may determine an angular deviation and a maximum angular deviation for a received primitive. Hull shader 48 determines a tessellation factor for the primitive by dividing the angular deviation by the maximum angular deviation, and rounds the result up to the closest integer value. Hull shader 48 then divides the length of the original line segment of the primitive by the tessellation factor to determine a tessellation delta (tessDelta) value, which hull shader 48 outputs to tessellator 50.

In a second pass, i.e. when operating on the path 2 domain type, tessellator 50 may receive the tessellation factors, which include the tessellation delta value that hull shader 48 outputs. Tessellator 50 may determine additional u-v domain coordinates by dividing or "cutting" the segment of 5A into sub-segments if an input segment has a length greater than the received tessellation delta value.

As part of the division process, tessellator 50 determines new u- and v-start and end point coordinates for the sub-segments. To determine the u- and v-coordinates of each sub-segment, tessellator 50 utilizes the same linear interpolation techniques as described above with respect to FIGS. 4A and 4B. In particular, tessellator 50 determines a tessellation factor based on the tessellation delta value, and linearly interpolates u-coordinate values based on the tessellation factor. In the example of FIGS. 5A and 5B, tessellator 50 may determine a tessellation factor of 3 for the segment of FIG. 5A, which indicates tessellator 50 should divide the segment of FIG. 5A into three sub-segments. Tessellator 50 then determines and outputs u-coordinates for the endpoints of each of the three line segments. In the example of FIG. 5B, the determined u-v coordinates of the four endpoint domain coordinates are: (0,0), (0.333, 0), (0.666, 0), and (1, 0). Tessellator 50 also determines new normal for the endpoints of the new sub-segments. The new normals for the sub-segments are indicated by the two innermost arrows.

Once tessellator 50 determines and outputs the domain coordinates for the sub-segments, domain shader 52 determines vertex coordinates for the start and end points of the sub-segments based on the domain coordinates, control point data from hull shader 48, and information indicative of a graphical feature associated with the determined domain coordinates. In this instance, the information indicative of the graphical feature may indicate that the domain coordinates are associated with a line segment, rather than a start point or an end point.

Figure 6A:
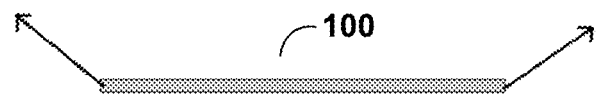
FIGS. 6A-6C are conceptual diagrams illustrating re-tessellating of line segments and applying dashing to line segments in accordance with the techniques of this disclosure.
Figure 6B:
Figure 6C:
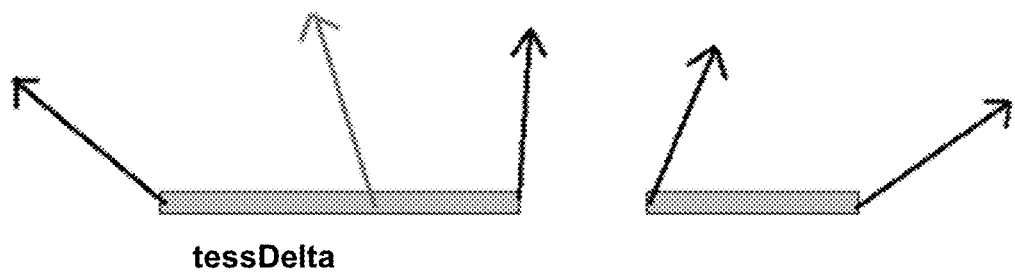

FIGS. 6A-6C are conceptual diagrams illustrating re-tessellating of line segments and applying dashing to line segments in accordance with the techniques of this disclosure. FIG. 6A illustrates a line segment 100 with endpoints normals that may exceed a maximum angular deviation. As described above with respect to FIGS. 5A-5B, hull shader 48 may determine the maximum angular deviation and output a tessellation delta that tessellator 50 receives as input. Tessellator 50 determines additional domain coordinates corresponding to additional sub-segments if the length of the original segment exceeds the tessellation delta value. Domain shader 52 may determine vertex coordinates of the sub-segments. Splitting line segment 100 into sub-segments may improve the appearance of the rendered sub-segments, which may comprise a curve.

Unlike the process described with respect to FIGS. 5A and 5B, in the example of FIG. 6B, tessellator 50 determines domain coordinates for sub-segments exceeding a tessellation delta value when operating on the path 2 domain, i.e. in a second tessellation pass. In the example of FIGS. 6A-6C, tessellator 50 determines domain coordinates for sub-segments of the segment of FIG. 6A based on a dashing pattern. For segments indicated by the dashing pattern as "off," tessellator 50 does not determine domain coordinates, and does not output any domain coordinates to later stages in graphics pipeline 40. For segments that are by the dashing pattern as "on," tessellator 50 determines start and end point domain coordinates, in accordance with the techniques described above with respect to FIGS. 5A-5B.

In the example of FIG. 6B, tessellator 50 determines whether the dashing pattern indicates the current portion of the segment is on or off. Tessellator 50 may maintain the dashing pattern as state in some examples. If the current segment is on, tessellator 50 may determine domain coordinates for the start and endpoints of the line segment. If the dashing pattern indicates that the current line segment is off, then tessellator 50 may drop or cut the "off" line segment and does not determine domain coordinates for the start and end points of the cut line segment.

When cutting a line segment, tessellator 50 may also cut the start and end caps or joins associated with that line segment. However, a dashing pattern or other state information may indicate that a previous "on" segment should have a start or end cap, which tessellator 50 deleted during the cutting of the off segment. Accordingly, tessellator 50 may determine domain coordinates for start or end caps for line segments that need them in accordance with the techniques of this disclosure. The process of determining start or end caps for a line segment is described in greater detail with respect to FIGS. 12 and 13A-13D.

Returning to the example of FIGS. 6A-6C, tessellator 50 determines domain coordinates for sub-segments 102 and 104 based on the dashing pattern. Tessellator 50 also determines that a portion of segment 100 should be cut, because the dashing pattern indicates that portion of segment 100 is "off" Tessellator 50 determines the u-coordinates for each of the sub-segments based on the dashing patterns, similar to the linear interpolation process described with respect to FIGS. 5A-5B. Once tessellator 50 has divided the segment of FIG. 6A into two sub-segments with a gap or cut between the two segments, hull shader 48 may determine whether the angular deviation between endpoint normals of a line segment exceeds a maximum angular deviation. If the endpoint normals exceed a maximum angular deviation, tessellator 50 may create additional domain coordinates corresponding to the endpoints of additional sub-segments. As described above with respect to FIGS. 5A-5B, if the endpoint normals exceed the determined maximum angular deviation, then tessellator 50 may determine domain coordinates for line sub-segments having length not greater than the tessellation delta input parameter, as illustrated in FIG. 6C. In FIG. 6C, tessellator 50 sub-divides the first segment (to the left of the cut) at length tessellation delta to create two segments with less divergent endpoint normals.

Figure 7A:
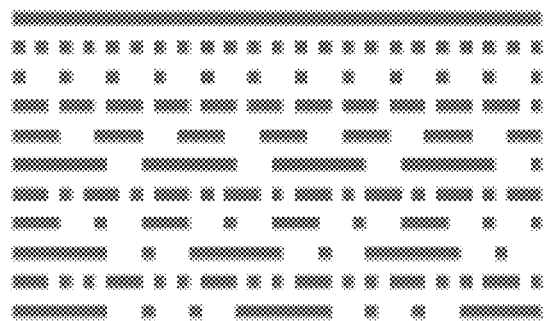
FIGS. 7A-7C are conceptual diagrams illustrating applying dashing in accordance with one or more techniques of this disclosure.
Figure 7B:
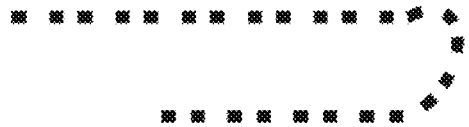
Figure 7C:

FIGS. 7A-7C are conceptual diagrams illustrating applying dashing in accordance with one or more techniques of this disclosure. FIG. 7A illustrates a number of dashing patterns. Dashing patterns may be comprised of a number of "on" line segments, which GPU 20 may render, and a number of "off" line segments, which GPU 20 may not render. The on and off segments in the dashing pattern may be have varying lengths, as illustrated in FIG. 7A. FIG. 7B illustrates another example dashing pattern, which tessellator 50 may output to domain shader 52 and geometry shader 54. The dashing example of FIG. 7B does not have end caps have applied to illustrate that tessellator 50 does not apply end caps or dashing. FIG. 7C illustrates the dashing pattern of FIG. 7B after geometry shader 54 applies end caps, to the "on" line segments.

Techniques are now described for rendering joins. Joins may be applied at locations where different path segments meet. In some examples, there may be three different types of joins: (1) bevel; (2) miter; and (3) round. In some examples, the type of join to be rendered may be stored in a buffer in GPU 12 (e.g., a patch constant buffer), and CPU 6 may indicate the type of join to use for rendering by placing a value indicative of the type of join into the buffer.

A join may be formed at a location or position where two path segments meet. To render a join, CPU 6 may place data indicative of the position where the two path segments meet and data indicative of the two tangents at that position (i.e., one tangent for each path segment) into a buffer (e.g., a vertex buffer in path data 36) for consumption by GPU 12.

In some examples, the input path data for a join may take the following form or a similar form:
{XMFLOAT3(pos.x, pos.y, 5.0f)},
{XMFLOAT3(tan 0.x, tan 0.y, 1.0f)},
{XMFLOAT3(tan 1.x, tan 1.y, 1.0f)},
{XMFLOAT3(0.0f, 0.0f, 1.0f)}, In this example, each row represents a vertex or control point of a four control point patch, and each parameter in the parentheses represents an attribute of a respective vertex or control point. The last attribute for the first control point, in this example, stores data indicative of the type of path to be rendered (i.e., a "path type indicator"). Specifically, the path type indicator in this example is 5.0f, which means that the path segment is a join path segment. The type of join path segment (e.g., bevel, miter, or round) may be indicated by a value stored in a buffer (e.g., a patch constant buffer) of GPU 12. In this example, pos.x and pos.y are the (x, y) coordinates that correspond to the position or location where the two path segments meet, tan 0.x and tan 0.y are the (x, y) coordinates that correspond to a normal vector for a first one of the two path segments at the position or location where the two path segments meet, and tan 1.x and tan 1.y are the (x, y) coordinates that correspond to a normal vector for a second one of the two path segments at the position or location where the two path segments meet. In some examples, CPU 6 may determine the coordinates for the normal vectors based on data indicative of one or both of the two path segments. The remaining vertices and attributes in this example may be unused and/or may be used to indicate other attributes for the join.

In some examples, to render a join, hull shader 48 may convert the normal vectors {(tan 0.x, tan 0.y) and (tan 1.x, tan 1.y)} that correspond to the join from Cartesian coordinates to angular coordinates. In further examples, hull shader 48 may normalize the normal vectors {(tan 0.x, tan 0.y) and (tan 1.x, tan 1.y)} that correspond to the join prior to converting the Cartesian coordinates to angular coordinates. In additional examples, hull shader 48 may place the angular coordinates for the normal vectors into one or more attributes of the patch control list received by hull shader 48 and pass the modified patch control list to domain shader 52 for further processing.

As one specific example, an input patch control list received by hull shader 48 for a join may be as follows:
{XMFLOAT3(0.4f, 0.8f, 5.0f)}//location
{XMFLOAT3(0.8f, 0.0f, 1.0f)}//first tangent
{XMFLOAT3(0.2f, −0.2f, 1.0f)}//second tangent
{XMFLOAT3(0.0f, 0.0f, 1.0f)}

In this example, hull shader 48 may generate an angular coordinate for each tangent (i.e., normal vector) and, for each tangent, place the angular coordinate into the third attribute of the control point that corresponds to the respective tangent. The resulting patch control list may, in some examples, take the following form:
{XMFLOAT3(0.4f, 0.8f, 5.0f)}//location
{XMFLOAT3(0.8f, 0.0f, 0.0f)}//first tangent
{XMFLOAT3(0.2f, −0.2f, 5.5f)}//second tangent
{XMFLOAT3(0.0f, 0.0f, 1.0f)}

In some examples, hull shader 48 may implement the following pseudo-code and/or shader program code to normalize the tangents, and convert the Cartesian coordinates for the tangents into angular coordinates:

```
if ( (join AND (ControlPointId == 1 or 2) ) OR (cap AND
ControlPointId == 1) )
{
    // convert tangent to angle for faster lerping later
    normalizedTangent = normalize(
inputPatch[ControlPointId] )
    angle = acos( normalizedTangent.x )
    if ( normalizedTangent.y < 0 )
    angle = 2.0f*PI − angle;
    // save the angle representation in the Z coordinate
of the control point vertex
    output.z = a0;
}
```

Figure 8:
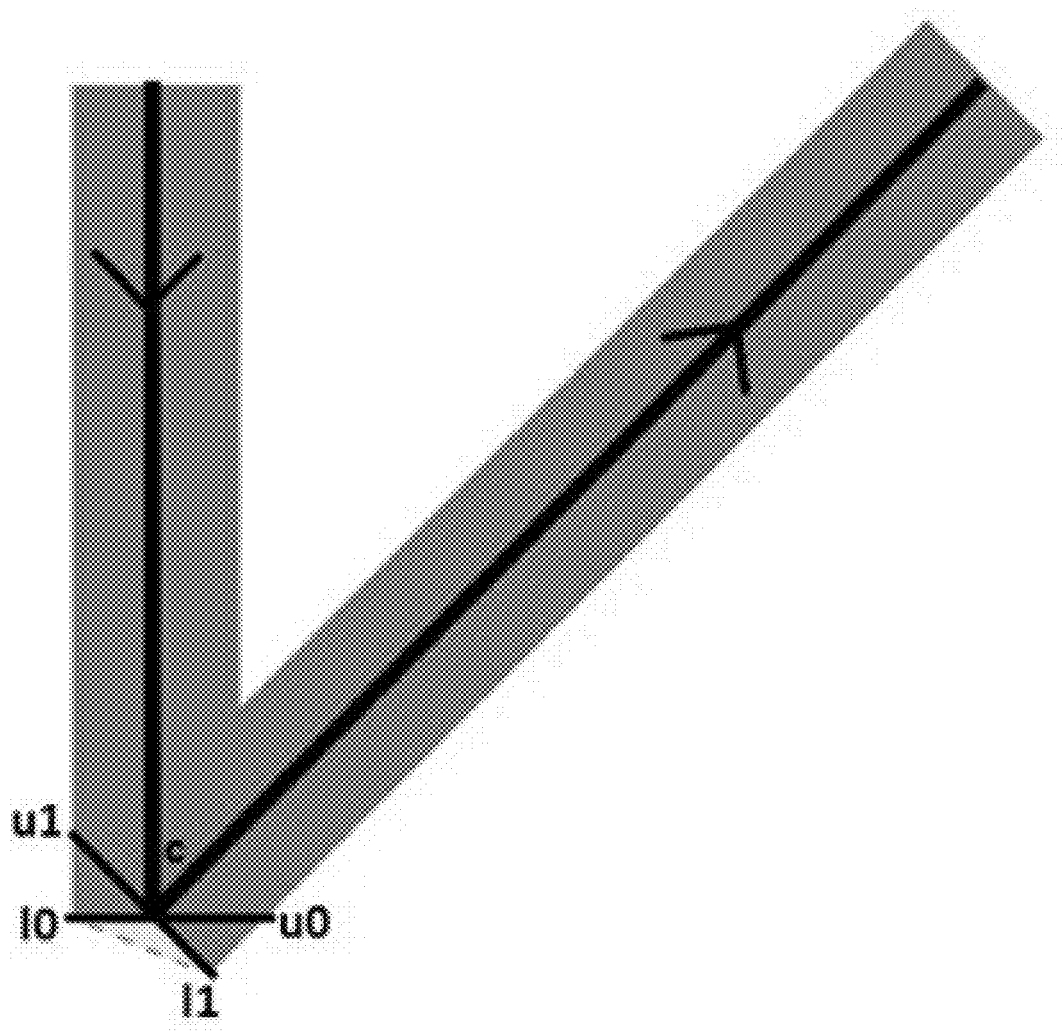
FIG. 8 is a conceptual diagram illustrating an example bevel join.

FIG. 8 is a conceptual diagram illustrating an example bevel join. For bevel joins, GPU 12 may render one or more triangles that spatially correspond to the bevel area (e.g., the light-shaded triangle shown in FIG. 8). As shown in FIG. 8, point c may correspond to an endpoint of a path segment where two path segments meet, u0 and l0 may correspond to corner points generated based on the first path segment for the endpoint (i.e., c), and u1 and l1 may correspond to corner points generated based on the second path segment for the endpoint (i.e., c).

In some examples, domain shader 52 may receive a patch control list from hull shader 48, and provide a vertex to geometry shader 54. The vertex may include one or more attributes indicative of the common endpoint where two path segments meet (i.e., point c), one or more attributes indicative of the normals for each of the path segments at the common endpoint, and one or more attributes indicative of the type of path rendering primitive (e.g., a join in this case).

Figure 9:
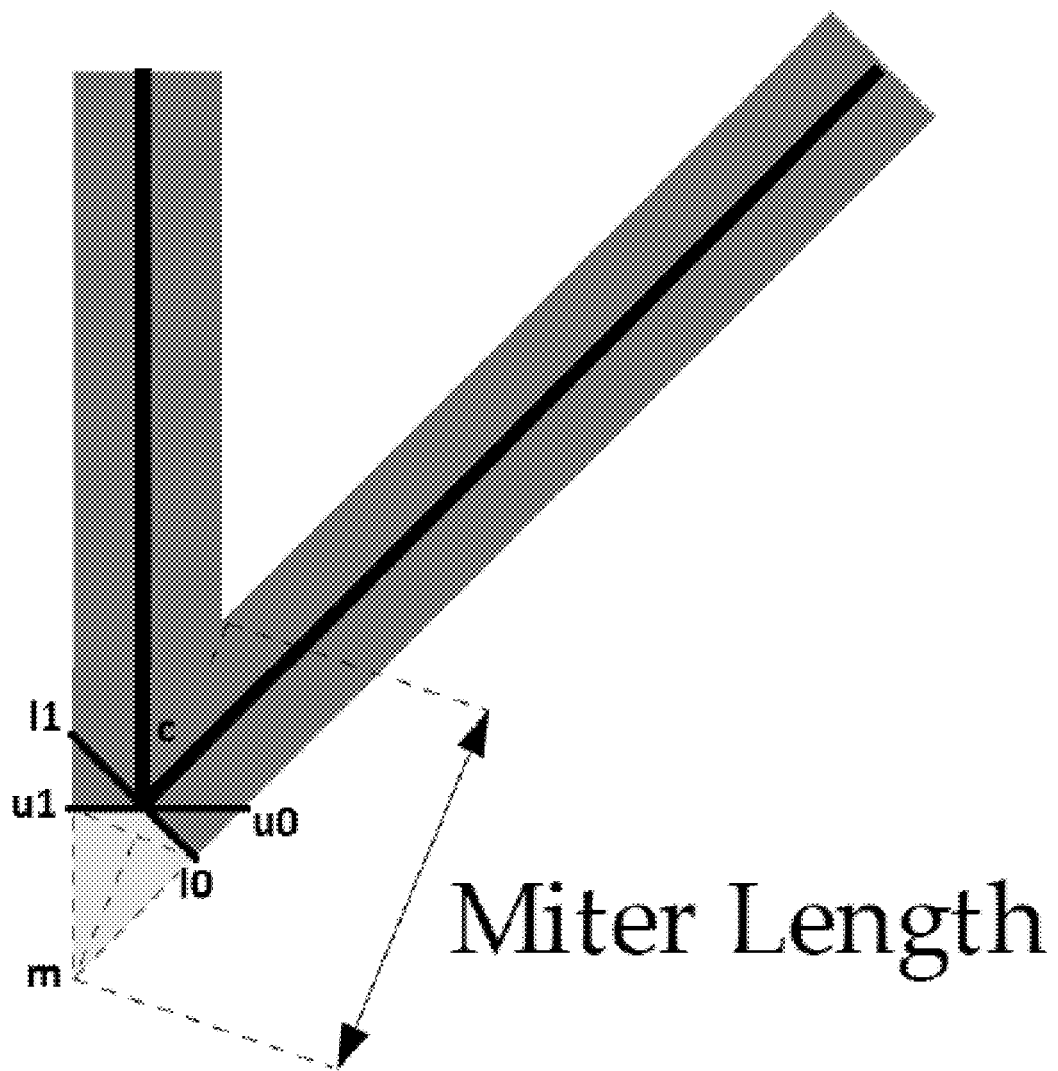
FIG. 9 is a conceptual diagram illustrating an example miter join.

FIG. 9 is a conceptual diagram illustrating an example miter join. For miter joins, GPU 12 may render one or more triangles that spatially correspond to the miter area. One of the triangles rendered for the miter join may be similar to the triangle rendered for the bevel join as described above with respect to FIG. 8. However, miter joins may have an additional triangle compared to the bevel join.

As shown in FIG. 9, point c may correspond to an endpoint of a path segment where two path segments meet, u0 and l0 may correspond to corner points generated based on the first path segment for the endpoint (i.e., c), and u1 and l1 may correspond to corner points generated based on the second path segment for the endpoint (i.e., c) Similar to the bevel join described above with respect to FIG. 8, domain shader 52 may receive a patch control list from hull shader 48, and provide a vertex to geometry shader 54. The vertex may include one or more attributes indicative of the common endpoint where two path segments meet (i.e., point c), one or more attributes indicative of the normals for each of the path segments at the common endpoint, and one or more attributes indicative of the type of path rendering primitive (e.g., a join in this case).

Figure 10:
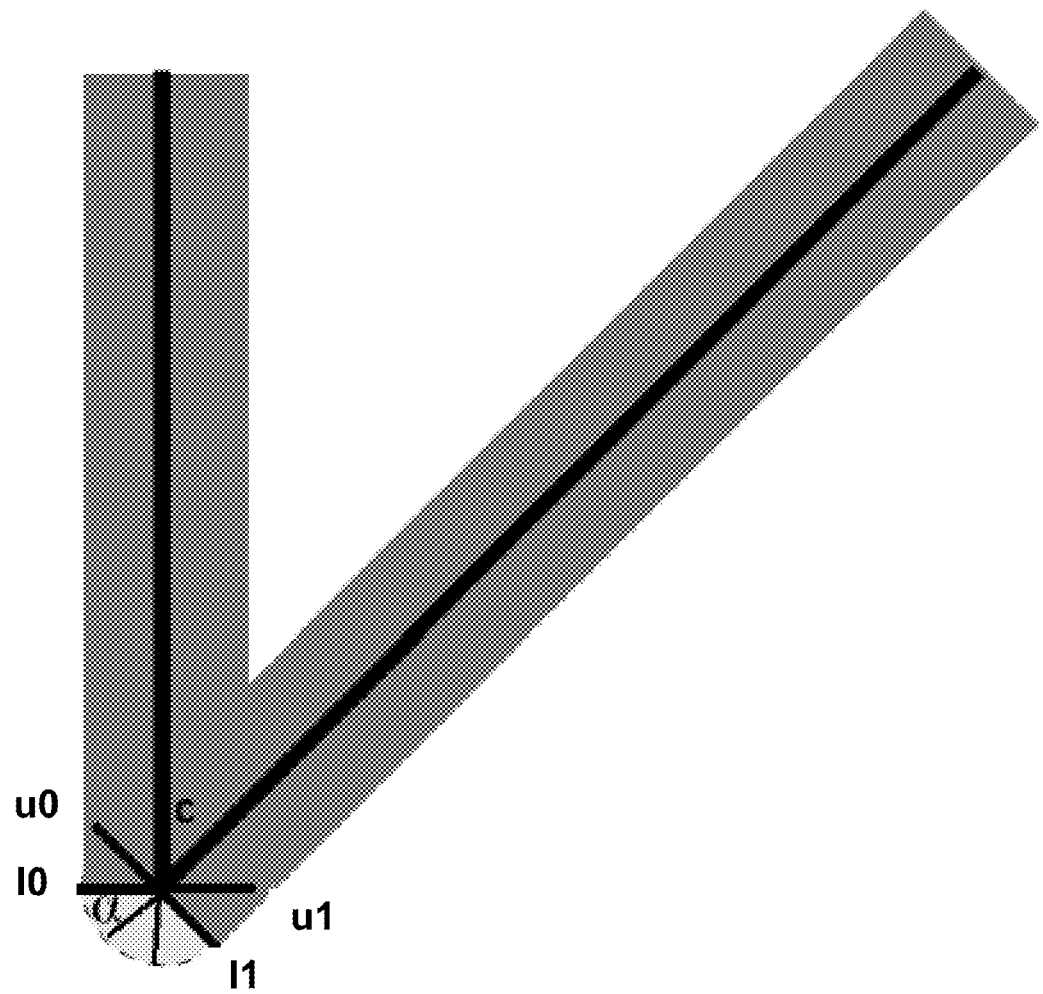
FIG. 10 is a conceptual diagram illustrating an example round join.

FIG. 10 is a conceptual diagram illustrating an example round join. As shown in FIG. 10, point c may correspond to an endpoint of a path segment where two path segments meet, u0 and l0 may correspond to corner points generated based on the first path segment for the endpoint (i.e., c), and u1 and l1 may correspond to corner points generated based on the second path segment for the endpoint (i.e., c). Described herein is a technique that utilizes tessellation stages 62 to provide GPU-accelerated rendering of a round join.

In accordance in accordance with the techniques of this disclosure, graphics pipeline 40 may use tessellation stages 62 to generate a plurality vertices, each having an associated normal direction, for the round join area. Each vertex may correspond to a respective slice of the join area where each slice is defined by the common endpoint (i.e., c) and two respective points along the curved edge of the round join. To approximate the slice, tessellator 50 may determine domain coordinates corresponding to the vertices along the edge of the round join that are associated with the slice to approximate the curvature the slice of the join. To render the join, in such examples, domain shader 52 may determine vertex coordinates for each of the slice approximations based on the domain coordinates for each of the slice approximations, which together may approximate the aggregate area of the join.

To generate the slice approximations for a round join, tessellator 50 may determine a normal of the start point of the subsequent line segment. As described above, tessellator 50 receives a join tessellation factor indicating the number of segments for which tessellator 50 determines domain (u-v) coordinates. The u-coordinate for each of the domain coordinates associated with a join is always equal to one, because the join always occurs at the endpoint of the current segment that tessellator 50 is joining.

To determine the v-coordinates of each of the domain coordinates, tessellator 50 linearly interpolates each of the v-coordinate values based on the tessellation factor such that the starting v-coordinate of the first domain coordinate associated with the join is zero, the last v-coordinate associated with the join is one, and all other v-coordinate values corresponding to the domain coordinates (or vertices) between these two points have evenly distributed v-coordinates. As an example, for a join with a join tessellation factor of "3," tessellator 50 may output u-v coordinates corresponding to three slices. Each slice may correspond to a vertex with a normal direction (referred to as a pos+normal). In the example of FIG. 10, each of the vertices may have the same position, but may have a different normal. The different normal may be indicated by the differing u-v coordinates output by tessellator 50 that are associated with the vertices. The first coordinate pair has a u-v coordinates (1, 0), and corresponds to, e.g., point 10 of FIG. 10. The last domain coordinate pair has u-v coordinates (1, 1) and corresponds to the last line segment of the join, e.g., 11 of FIG. 10. The other two vertices have u-v coordinates (1, 0.33), and (1, 0.66). If a different number of slices are specified by a different join tessellation factor, the u-v coordinates for the end points of each of line segments may differ, but are still linearly distributed from zero to one on the v-axis.

In addition to determining the domain coordinates for the each of the line segments, tessellator 50 also determines information indicative of a graphical feature of for one or more of the determine domain coordinates of the join. In this example, the information indicative of the graphical feature may indicate that the domain coordinates are associated with a join. Subsequent stages, e.g., domain shader 52 may interpret the domain coordinates, as well as the associated information indicating that the domain coordinates are associated with a join to determine vertex coordinates for the join. After determining vertex coordinates, subsequent stages of graphics pipeline 40 may render the join.

Techniques are now described for rendering start and end caps, referred to as "endcaps." Endcaps may be applied at the beginning and/or end of a path that is formed from a plurality of path segments. In some examples, there may be two different types of endcaps: (1) square caps; and (2) round caps. In some examples, the type of endcap to be rendered may be stored in a buffer in GPU 12 (e.g., a patch constant buffer), and CPU 6 may indicate the type of endcap to use for rendering by placing a value indicative of the type of endcap into the buffer.

An endcap may be formed at the beginning or end of a path segment that corresponds to the beginning or end of a path. To render an endcap, CPU 6 may place data indicative of the position of the endcap (e.g., the endpoint of a path segment) and data indicative of a tangent at that position into a buffer (e.g., a vertex buffer in path data 36) for consumption by GPU 12.

In some examples, the input path data for an endcap may take the following form or a similar form:
 {XMFLOAT3(pos.x, pos.y, 6.0f)},
 {XMFLOAT3(tan.x, tan.y, 1.0f)},
 {XMFLOAT3(0.0f, 0.0f, 1.0f)},
 {XMFLOAT3(0.0f, 0.0f, 1.0f)},
In this example, each row represents a vertex or control point of a four control point patch, and each parameter in the parentheses represents an attribute of a respective vertex or control point. The last attribute for the first control point, in this example, stores data indicative of the type of path to be rendered (i.e., a "path type indicator"). Specifically, the path type indicator in this example is 6.0f, which means that the path segment is an endcap path segment. The type of endcap path segment (e.g., square or round) may be indicated by a value stored in a buffer (e.g., a patch constant buffer) of GPU 12. In this example, pos.x and pos.y are the (x, y) coordinates that correspond to the position or location where the endcap is formed (e.g., the endpoint of a path segment), and tan.x and tan.y are the (x, y) coordinates that correspond to a normal vector for the position or location where the endcap is formed. In some examples, CPU 6 may determine the coordinates for the normal vector based on data indicative of the path segment on which the endcap is formed. The remaining vertices and attributes in this example may be unused and/or may be used to indicate other attributes for the cap.

In some examples, to render an endcap, hull shader 48 may convert the normal vector (tan.x, tan.y) that corresponds to the endcap from Cartesian coordinates to angular coordinates. In further examples, hull shader 48 may normalize the normal vector (tan.x, tan.y) that corresponds to the endcap prior to converting the Cartesian coordinates to angular coordinates. In additional examples, hull shader 48 may place the angular coordinates for the normal vector into one or more attributes of the patch control list received by hull shader 48 and pass the modified patch control list to domain shader 52 for further processing. In some examples, hull shader 48 may implement the pseudo-code and/or shader program code discussed above with respect to joins to normalize the tangents and/or to convert the Cartesian coordinates for the tangents into angular coordinates.

As one specific example, an input patch control list received by hull shader 48 for an endcap may be as follows:
 {XMFLOAT3(−0.4f, 0.8f, 6.0f)}//location
 {XMFLOAT3(0.8f, 0.0f, 1.0f)}//tangent
 {XMFLOAT3(0.0f, 0.0f, 1.0f)}

{XMFLOAT3(0.0f, 0.0f, 1.0f)}

Figure 11:
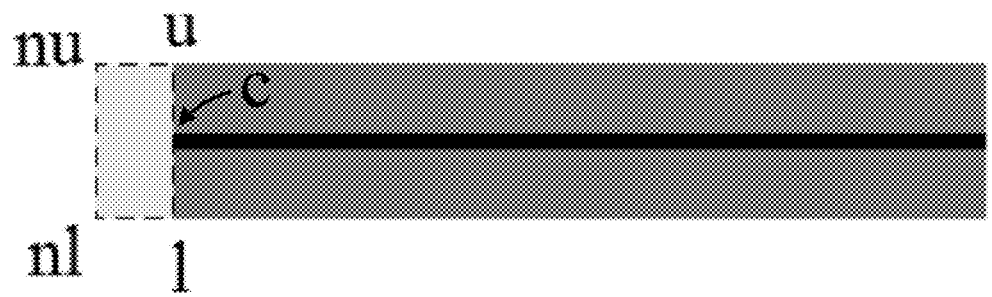
FIG. 11 is a conceptual diagram illustrating an example square cap.

In this example, hull shader 48 may generate an angular coordinate for the tangent (i.e., normal vector), and place the angular coordinate in the third attribute of the control point that contains the tangent. The resulting patch control list may, in some examples, take the following form:

{XMFLOAT3(−0.4f, 0.8f, 6.0f)}, //location
{XMFLOAT3(0.8f, 0.0f, 0.0f)}, //tangent
{XMFLOAT3(0.0f, 0.0f, 1.0f)},
{XMFLOAT3(0.0f, 0.0f, 1.0f)}, FIG. 11 is a conceptual diagram illustrating an example square cap. For square caps, GPU 12 may render one or more triangles that spatially correspond to the cap area (e.g., the light-shaded rectangle shown in FIG. 11). As shown in FIG. 11, point c may correspond to an endpoint of a path segment, and u and l may correspond to corner points generated based on the endpoint (i.e., c) of the path segment at which the cap is formed.

In some examples, domain shader 52 may receive a patch control list from hull shader 48, and provide a vertex to geometry shader 54. The vertex may include one or more attributes indicative of the endpoint of the path segment (i.e., point c) at which the cap is formed, one or more attributes indicative of a normal for the path segment at the endpoint (i.e., point c), and one or more attributes indicative of the type of path rendering primitive (e.g., a cap in this case).

Geometry shader 54 may, in some examples, receive a vertex from domain shader 52, and determine the corner points (u, l) for the vertex based on one or more of equations as described in this disclosure. Geometry shader 54 may determine a vector v according to the following equation:

$$v=(u-l)/2 \qquad (15)$$

where u and l correspond to corner points of a stroke area for an endpoint of a path segment.

Geometry shader 54 may rotate the vector, v, by 90 degrees to find a vector, n, according to the following equation:

$$n=(v.y,-v.x) \qquad (16)$$

where a=(x, y) indicates the x and y components of the vector, a, where v.y corresponds the y-component of the vector v, and where v.x corresponds to the x-component of the vector v.

Geometry shader 54 may determine new points (e.g. vertices) for a starting cap or an ending cap according to the following equations:

$$nu=u\pm n \qquad (17)$$

$$nl=l\pm n \qquad (18)$$

where nu and nl are new corner points for the cap, and u and l correspond to corner points of a stroke area for an endpoint of a path segment.

Geometry shader 54 may generate one or more triangles for rendering the square cap that spatially correspond to the square cap area. For example, geometry shader 54 may generate two triangles (e.g., (u, l, nu) and (nu, l, nl)), that spatially correspond to the square cap area. Graphics pipeline 40 may render the one or more triangles generated by geometry shader 54 for the square cap area. Once the one or triangles have been rendered, the render target (e.g., the frame buffer) may store a rasterized version of the stroke area for a square cap.

In some examples in accordance with the techniques of this disclosure, GPU 12 may utilize tessellating stages 62 to determine the vertex coordinates of a square cap. Hull shader 48 may output a start cap tessellation factor and/or an end cap tessellation factor to tessellator 50. A non-zero end cap tessellation factor is mutually exclusive with a non-zero join tessellation factor, because an end cap and a join cannot coexist on the end point of a line segment. The startcap or endcap tessellation factor may have a value equal to one, which causes the tessellator to preserve and output domain coordinates having the original vertex position and normal associated with the endpoint of the line segment, but which are associated with the square start or end cap.

Figure 12:
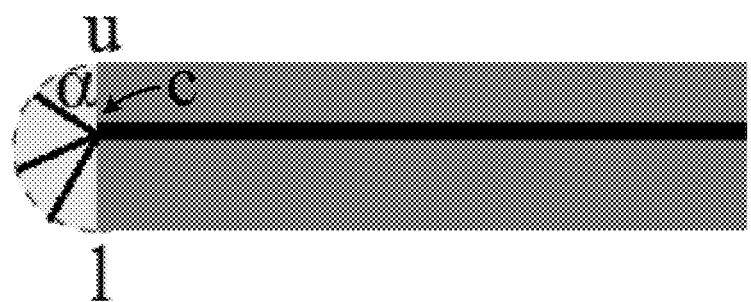
FIG. 12 is a conceptual diagram illustrating an example round cap.

FIG. 12 is a conceptual diagram illustrating an example round cap. As shown in FIG. 12, point c may correspond to an endpoint of a path segment, and u and l may correspond to corner points generated based on the endpoint (i.e., c) of the path segment at which the cap is formed. GPU 12 may render the round cap in a similar manner to either of the techniques described above for rendering round joins.

In accordance with the techniques of this disclosure, GPU 12 may utilize tessellating stages 62 to determine the vertex coordinates of a round cap. Hull shader 48 may output a start cap tessellation factor and/or an end cap tessellation factor to tessellator 50. A non-zero end cap tessellation factor is mutually exclusive with a non-zero join tessellation factor, because an end cap and a join cannot coexist on the end point of a line segment.

As described above in FIG. 10 with respect to joins, tessellator 50 determines u-v coordinates that are linearly distributed, and that correspond to slice approximations of a round cap Tessellator 50 outputs domain coordinates based on the received join tessellation factor. If the cap is a start cap, the u-coordinate of all of the domain coordinates which tessellator 50 outputs is equal to zero. If the cap is an end cap, the u-coordinate of all the domain coordinates which tessellator 50 outputs is equal to one. Assuming a start cap tessellation factor of four, which indicates that the cap should be divided into four slices, and have coordinates corresponding to five line segments, the u-v coordinates that tessellator 50 determines and outputs for a join are: (1, 0), (1, 0.25), (1, 0.5), (1, 0.75), and (1, 1). In addition to determining the domain coordinates, tessellator 50 also determines information indicative of a graphical feature, in this case, a start cap or an end cap. Domain shader 52 receives the domain coordinates and the information associating the domain coordinates as being part of a start or an end cap, and determines vertex coordinates for each of the domain coordinates.

Figure 13A:
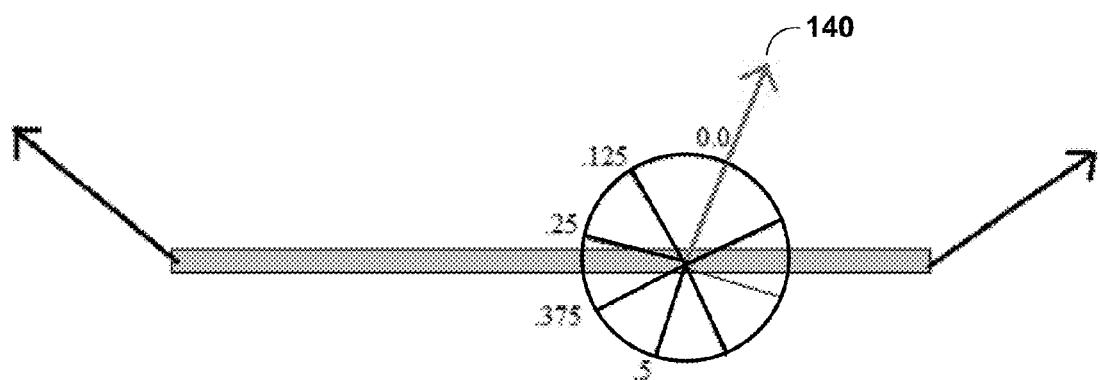
FIGS. 13A-13D are conceptual diagrams illustrating applying endcaps and join in accordance with one or more techniques of this disclosure.
Figure 13B:
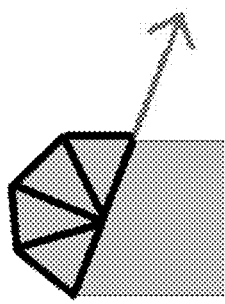

FIGS. 13A-13D are conceptual diagrams illustrating applying caps and join in accordance with one or more techniques of this disclosure. FIGS. 13A-13B illustrate techniques for rendering caps using tessellator 50. In FIG. 13A, a line segment is subdivided into two sub-segments. One of the sub-segments has an endpoint normal 80 to which tessellator 50 is to apply an endcap, e.g., based on one or more vertex parameters, as described above. In some examples, the vertex parameters may be specified in accordance with OpenVG rendering commands.

In the case of a round endcap illustrated in FIGS. 13A-13B, tessellator 50 receives an endcap tessellation factor as input and uses the tessellation factor to determine a number of triangles to sub-divide the end of the line segment into. Tessellator 50 then divides the end of the line segment into the triangles, by determining coordinates radially around the center point of normal 140. The output of the division is a number of u- and v-domain coordinates. The u-coordinate may generally correspond to the center of the rotation, and the v-coordinates may generally correspond to the points rotated radially about the center (u-coordinate) of normal 140. As described above, the domain coordinates associated with a start cap may have u-coordinates equal to zero, and domain coordinates associated with an endcap may have u-coordinates equal to one. After tessellator 50 determines the u- and v-coordinates for the endcap, domain shader 52 may calculate vertex coordinates according to the u- and v-coordinate values about the center of the circular endcap. The center point 140 corresponds to the end point of the line segment to which the endcap is to be applied. In general, the u-coordinate values may range from [0, 1]. However, in the case where the tessellator is operating on the path 2 domain, the v-coordinates of a start cap may range from [0, 0.5], and the v-coordinates for an end cap may range from [0.5, 1]. The limitations on the range of v-coordinate values when operating on the path 2 domain allows domain shader 52 to determine whether domain coordinates output from tessellator 50 are for a start cap or an end cap. When operating on the path 2 domain, domain shader 52 infers that the domain coordinates output by tessellator 50 are associated with a start cap if the v-coordinates are in the range [0, 0.5], and for an end cap if the v-coordinates are in the range [0.5, 1].

Figure 13C:
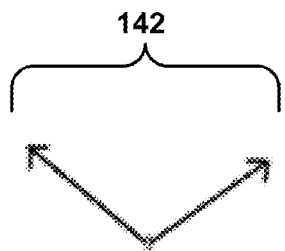
Figure 13D:
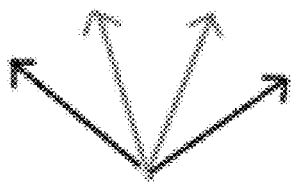

FIGS. 13C-13D illustrate a technique for applying a round join based on the techniques illustrated in FIGS. 13A-13B. In the example of 13C, two line segments may have endpoints that need to be joined using a round join. The area to be joined is indicated by callout 142. To generate the round join for the line segments of FIG. 13C, tessellator 50 may perform a similar process to that illustrated in FIGS. 13A-13B of determining the u-coordinate of a center point, and determining a number of v-coordinates that correspond to points that are rotated radially about the center, u-coordinate. Tessellator 50 then outputs the u- and v-coordinates to domain shader 54, which calculates the vertex locations based on the u- and v-coordinates.

Figure 14A:
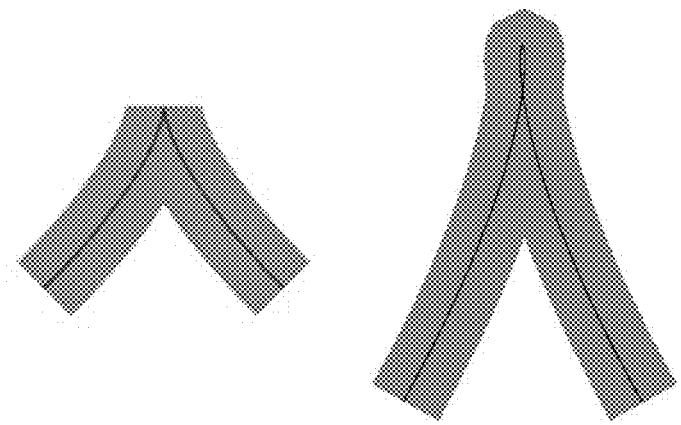
FIGS. 14A-14B are conceptual diagrams illustrating re-tessellation of cusps of a line segment in accordance with the techniques of this disclosure.
Figure 14B:
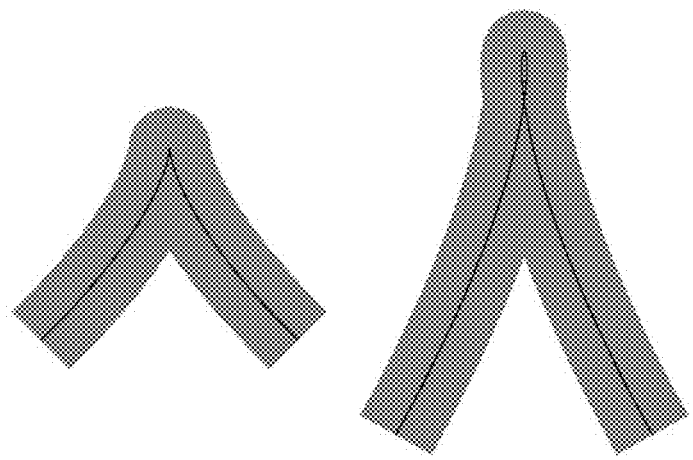

FIGS. 14A-14B are conceptual diagrams illustrating re-tessellation of cusps of a line segment in accordance with the techniques of this disclosure. FIG. 14A illustrates two line segments which have a "cusp" at their intersection. A cusp is defined as an intersection between two line segments, where the tangent of the two line segments exceeds a maximum angular threshold, or where the tangent at the intersection point is undefined.

In accordance with the techniques of this disclosure, tessellator 50 may perform re-tessellation, such as circular re-tessellation described above with respect to FIGS. 13A-13D in order to smooth the path at an intersection point having a cusp. FIG. 14B illustrates the result of performing circular re-tessellation at the intersection point of the two line segments.

To perform cusp handling, tessellation stages 62 may perform similar techniques to those described above with respect to FIGS. 5A-5B, and FIGS. 6A-6B. That is, tessellator 50 may receive a tessellation factor, referred to as a tessellation delta value, which is used to determine the maximum length of a line segment. Hull shader 48 determines the tessellation delta value based on an angular deviation of the endpoint normals of a primitive and a maximum angular deviation value. If the length of an input segment exceeds the tessellation delta value, tessellator 50 determines domain coordinates corresponding to sub-segments having a length less than the tessellation delta.

Tessellator 50 outputs the domain coordinates corresponding to the sub-segments to domain shader 52 along with information indicating that the sub-segments are part of a line segment, as opposed to a cap or a join. Based on the domain coordinates and the information indicating the domain coordinates of the sub-segments are associated with the line segment graphical feature, domain shader 52 determines vertex coordinates for the sub-segments. When rendered, the sub-segments may add smoothness or curvature to the final rendered curve, as illustrated in FIG. 14B.

Figure 15:
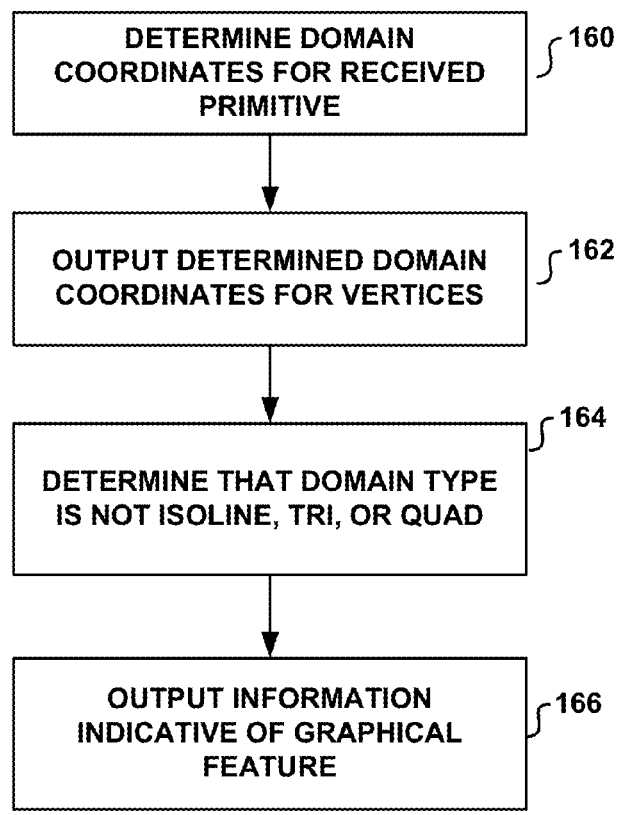
FIG. 15 is a flow diagram illustrating an example technique for performing GPU-accelerated path rendering according to this disclosure.

FIG. 15 illustrates techniques for performing GPU-accelerated path rendering according to this disclosure. The techniques shown in FIG. 15 is described as being performed by GPU 12 shown in FIGS. 1 & 2 and with graphics pipeline 40 shown in FIG. 3 for exemplary purposes. In other examples, the techniques illustrated in FIG. 15 may be implemented in other systems that have same or different components in the same or a different configuration.

FIG. 15 is a flow diagram illustrating an example technique for performing GPU-accelerated path rendering according to this disclosure. For the purposes of example only, a tessellation unit, such as tessellator 50 of FIG. 3 may perform the techniques illustrated in FIG. 15. In the process of FIG. 15, tessellator 50 determines domain coordinates for vertices of a received primitive (160). Tessellator 50 outputs the determined domain coordinates for the vertices (162). Tessellator 50 determines that a domain type for the received primitive is not one of tri, isoline, or quad domain (164). Tessellator 50 then outputs information indicative of a graphical feature associated with one or more of the determined domain coordinates when the domain type is not one of the tri, isoline, or quad domain (166).

To output the information indicative of the graphical feature, tessellator 50 may output the information indicative of the graphical feature based on the tessellation factors. In some examples, the information indicative of the graphical representation comprises data indicating that the graphical feature is one of: an end cap, a line segment, and a join.

Figure 16:
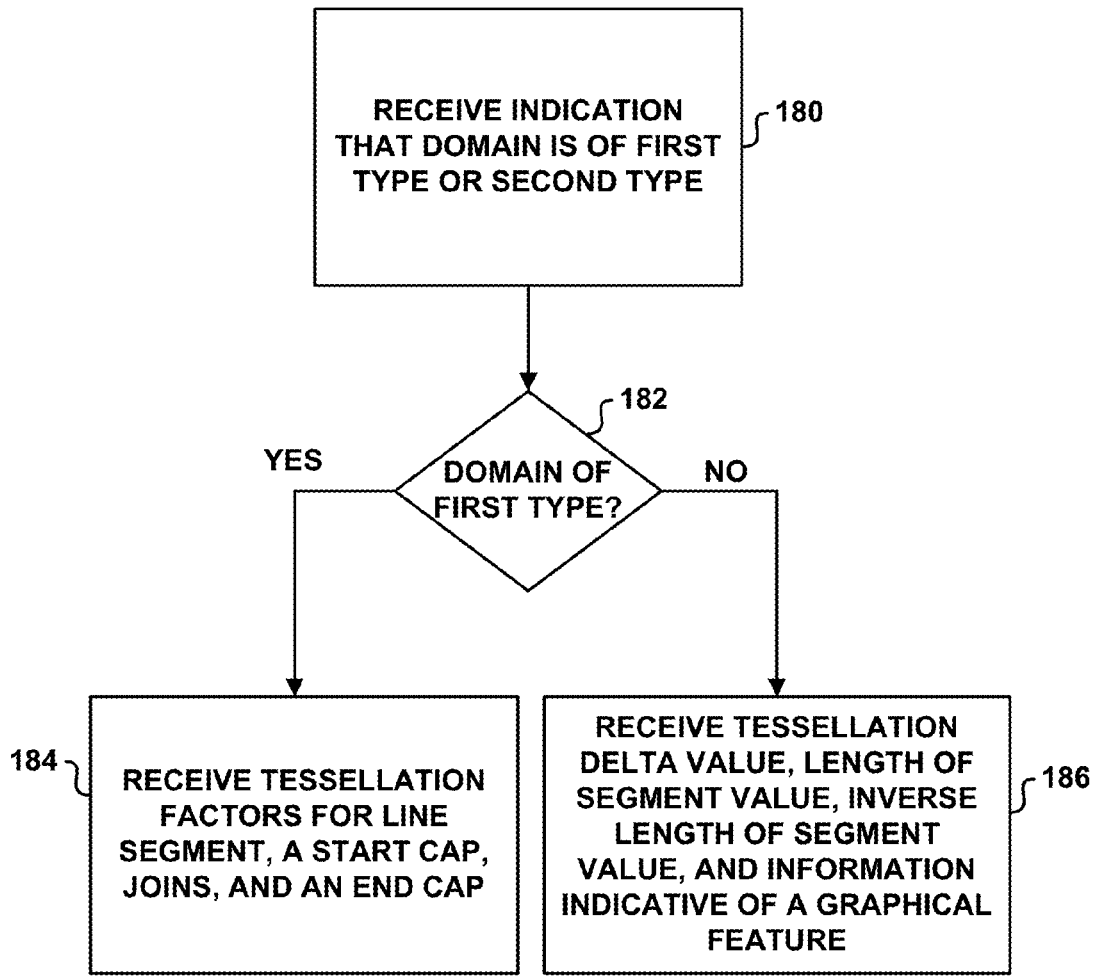
FIG. 16 is a flow diagram illustrating an example technique for performing GPU-accelerated path rendering according to this disclosure.

FIG. 16 is a flow diagram illustrating an example technique for performing GPU-accelerated path rendering according to this disclosure. In some examples tessellator 50 may receive tessellation factors. To interpret the tessellation factors, tessellator 50 may receive an indication of a domain type that is one of a first type and a second type (180). When the domain type is the first type ("YES" branch of decision block 182), tessellator 50 may receive a tessellation factor for a line segment, a tessellation factor for a start cap, a tessellation factor for joins, and a tessellation factor for an end cap (184). In this instance, tessellator 50 may determine the domain coordinates for the vertices of the received primitive by determining an endpoint normal of a line segment and linearly interpolating, with the tessellation unit, u-coordinate and v-coordinate pairs of a start cap or an end cap based on the endpoint normal of the line segment and the tessellation factor for the start cap or the tessellation factor for the end cap.

When the domain type is the second type ("NO" branch of decision block 182), tessellator 50, receiving the tessellation factors may comprise receiving a tessellation delta value, a length of segment value, an inverse length of segment value, and information indicative of a graphical feature (186). In this instance, to determine the domain coordinates, tessellator 50 may determine additional domain coordinates based on the tessellation delta value, the length of segment value, the inverse length of segment value, and the information indicative of a graphical feature, determining information indicative of a graphical feature associated with one or more of the additional determined domain coordinates. Tessellator 50 may further output the additional determined domain coordinates, and output the determined information indicative of the graphical feature associated with the one or more additional determined domain coordinates.

In yet some other examples, tessellator 50 may determine the domain coordinates based on a dashing pattern, and the dashing pattern may be stored as state in tessellator 50. As yet another example in accordance with the techniques of this disclosure, tessellator 50 may determine the domain coordinates for vertices of a received primitive, output the determined domain coordinates for the vertices, and output the information indicative of the graphical feature in a first pass. Tessellator 50 may be further configured to: receive tessellation factors output by the tessellation unit in the first pass, determine, in a second pass, additional domain coordinates for vertices based on the tessellation factors received in the first pass, determine information indicative of a graphical feature for one or more of the additional domain coordinates, output the additional domain coordinates, and output the information indicative of the graphical feature associated with one or more of the additional domain coordinates.

In some examples, the techniques of this disclosure may be used to perform path rendering on DirectX GPUs. In further examples, the techniques of this disclosure may be implemented and tested on an OpenVG platform and/or may conform to OpenVG path rendering standards. In additional examples, the techniques of this disclosure may provide a GPU accelerated solution to path rendering for DirectX versions 9.3, 11 and 11+. DirectX 11+ may refer to a modified DirectX 11 architecture.

In some examples, a path may refer to a plurality of path segments, which may be, e.g., a line, an elliptic arc, a quadratic Bézier curve and a cubic Bézier curve. A path may be either "closed" or not (i.e., open). A closed path may refer to a path where the last vertex is connected to the first vertex via a line and where the path forms a closed shape. An open path may refer to path where the last vertex does not necessarily connect to the first vertex. A path may overlap itself numerous times. Path rendering may be divided into two main tasks: Filling and Stroking.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
   determining, with a tessellation unit of a graphics processing unit (GPU), domain coordinates for vertices of a received primitive;
   outputting, with the tessellation unit, the determined domain coordinates for the vertices;
   determining, with the tessellation unit, that a domain type for the received primitive is one of a first type or a second type, wherein the first type and the second type is not one of tri, isoline, or quad domain;
   receiving, with the tessellation unit, a tessellation factor for a line segment, a tessellation factor for a start cap, a tessellation factor for joins, and a tessellation factor for an end cap when the domain type for the received primitive is determined to be of the first type, or receiving, with the tessellation unit, a tessellation delta value, a length of segment value, and an inverse length of segment value when the domain type for the received primitive is determined to be of the second type; and
   outputting, with the tessellation unit, information indicative of a graphical feature associated with one or more of the determined domain coordinates when the domain type is not one of the tri, isoline, or quad domain.

2. The method of claim 1, further comprising:
   receiving, with the tessellation unit, tessellation factors;
   wherein outputting the information indicative of the graphical feature comprises outputting the information indicative of the graphical feature based on the tessellation factors.

3. The method of claim 2, wherein the information indicative of the graphical feature comprises data indicating that the graphical feature is one of: an end cap, a line segment, and a join.

4. The method of claim 1, the method further comprising:
   determining, with the tessellation unit, an endpoint normal of the line segment; and
   linearly interpolating, with the tessellation unit, u-coordinate and v-coordinate pairs of the start cap or the end cap based on the endpoint normal of the line segment and the tessellation factor for the start cap or the tessellation factor for the end cap.

5. The method of claim 1, further comprising:
   determining additional domain coordinates based on the tessellation delta value, the length of segment value, the inverse length of segment value, and the information indicative of a graphical feature;

determining, with the tessellation unit, information indicative of a graphical feature associated with one or more of the additional determined domain coordinates;

outputting, with the tessellation unit, the additional determined domain coordinates; and outputting, with the tessellation unit, the determined information indicative of the graphical feature associated with the one or more additional determined domain coordinates.

6. The method of claim 1, further comprising determining the domain coordinates based on a dashing pattern, wherein the dashing pattern is stored as state in the tessellation unit.

7. The method of claim 1, wherein determining the domain coordinates for vertices of a received primitive, outputting the determined domain coordinates for the vertices, and outputting the information indicative of the graphical feature occur in a first pass, the method further comprising:

receiving, with the tessellation unit, tessellation factors output by the tessellation unit in the first pass;

in a second pass, determining, with the tessellation unit, additional domain coordinates for vertices based on the tessellation factors received in the first pass;

determining, with the tessellation unit, information indicative of a graphical feature for one or more of the additional domain coordinates;

outputting, with the tessellation unit, the additional domain coordinates; and outputting, with the tessellation, the information indicative of the graphical feature associated with one or more of the additional domain coordinates.

8. A graphics processing unit (GPU) comprising a tessellation unit configured to:

determine domain coordinates for vertices of a received primitive;

output the determined domain coordinates for the vertices;

determine that a domain type for the received primitive is one of a first type or a second type, wherein the first type and the second type is not one of tri, isoline, or quad domain;

receive a tessellation factor for a line segment, a tessellation factor for a start cap, a tessellation factor for joins, and a tessellation factor for an end cap when the domain type for the received primitive is determined to be of the first type, or receive a tessellation delta value, a length of segment value, and an inverse length of segment value when the domain type for the received primitive is determined to be of the second type; and output information indicative of a graphical feature associated with one or more of the determined domain coordinates when the domain type is not one of the tri, isoline, or quad domain.

9. The GPU of claim 8, wherein the GPU is further configured to:

receive tessellation factors;

wherein to output the information indicative of the graphical feature, the tessellation unit is further configured to output the information indicative of the graphical feature based on the tessellation factors.

10. The GPU of claim 9, wherein the information indicative of the graphical feature comprises data that indicates that the graphical feature is one of: an end cap, a line segment, and a join.

11. The GPU of claim 8, wherein the GPU is further configured to:

determine an endpoint normal of the line segment; and linearly interpolate u-coordinate and v-coordinate pairs of the start cap or the end cap based on the endpoint normal of the line segment and the tessellation factor for the start cap or the tessellation factor for the end cap.

12. The GPU of claim 8, wherein the GPU is further configured to:

determine additional domain coordinates based on the tessellation delta value, the length of segment value, the inverse length of segment value, and the information indicative of a graphical feature;

determine information indicative of a graphical feature associated with one or more of the additional determined domain coordinates;

output the additional determined domain coordinates; and output the determined information indicative of the graphical feature associated with the one or more additional determined domain coordinates.

13. The GPU of claim 8, wherein the GPU is further configured to determine the domain coordinates based on a dashing pattern, wherein the dashing pattern is stored as state in the tessellation unit.

14. The GPU of claim 8, wherein to determine the domain coordinates for vertices of a received primitive, the GPU is further configured to output the determined domain coordinates for the vertices, and output the information indicative of the graphical feature in a first pass, wherein the GPU is further configured to:

receive tessellation factors output by the tessellation unit in the first pass;

in a second pass, determine additional domain coordinates for vertices based on the tessellation factors received in the first pass;

determine information indicative of a graphical feature for one or more of the additional domain coordinates;

output the additional domain coordinates; and output the information indicative of the graphical feature associated with one or more of the additional domain coordinates.

15. An apparatus comprising:

means for determining domain coordinates for vertices of a received primitive;

means for outputting the determined domain coordinates for the vertices;

means for determining that a domain type for the received primitive is one of a first type or a second type, wherein the first type and the second type is not one of tri, isoline, or quad domain;

means for receiving a tessellation factor for a line segment, a tessellation factor for a start cap, a tessellation factor for joins, and a tessellation factor for an end cap when the domain type for the received primitive is determined to be of the first type, or means for receiving a tessellation delta value, a length of segment value, and an inverse length of segment value when the domain type for the received primitive is determined to be of the second type; and means for outputting information indicative of a graphical feature associated with one or more of the determined domain coordinates when the domain type is not one of the tri, isoline, or quad domain.

16. The apparatus of claim 15, further comprising:

means for receiving tessellation factors;

wherein the means for outputting the information indicative of the graphical feature comprises means for outputting the information indicative of the graphical feature based on the tessellation factors.

17. The apparatus of claim 16, wherein the information indicative of the graphical feature comprises data indicating that the graphical feature is one of: an end cap, a line segment, and a join.

18. The apparatus of claim 15, the apparatus further comprising:
means for determining an endpoint normal of the line segment; and
means for linearly interpolating u-coordinate and v-coordinate pairs of the start cap or the end cap based on the endpoint normal of the line segment and the tessellation factor for the start cap or the tessellation factor for the end cap.

19. The apparatus of claim 15, the apparatus further comprising:
means for determining additional domain coordinates based on the tessellation delta value, the length of segment value, the inverse length of segment value, and the information indicative of a graphical feature;
means for determining information indicative of a graphical feature associated with one or more of the additional determined domain coordinates;
means for outputting the additional determined domain coordinates; and
means for outputting the determined information indicative of the graphical feature associated with the one or more additional determined domain coordinates.

20. The apparatus of claim 15, the apparatus further comprising means for determining the domain coordinates based on a dashing pattern, wherein the dashing pattern is stored as state in the tessellation unit.

21. The apparatus of claim 15, wherein determining the domain coordinates for vertices of a received primitive, outputting the determined domain coordinates for the vertices, and outputting the information indicative of the graphical feature occur in a first pass, the apparatus further comprising:
means for receiving tessellation factors output by the tessellation unit in the first pass;
means for determining, in a second pass, additional domain coordinates for vertices based on the tessellation factors received in the first pass;
means for determining information indicative of a graphical feature for one or more of the additional domain coordinates;
means for outputting the additional domain coordinates; and
means for outputting the information indicative of the graphical feature associated with one or more of the additional domain coordinates.

22. A non-transitory computer readable storage medium comprising instructions that, when executed, cause one or more processors to:
determine domain coordinates for vertices of a received primitive;
output the determined domain coordinates for the vertices;
determine that a domain type for the received primitive is one of a first type or a second type, wherein the first type and the second type is not one of tri, isoline, or quad domain;
receive a tessellation factor for a line segment, a tessellation factor for a start cap, a tessellation factor for joins, and a tessellation factor for an end cap when the domain type for the received primitive is determined to be of the first type, or receive a tessellation delta value, a length of segment value, and an inverse length of segment value when the domain type for the received primitive is determined to be of the second type; and
output information indicative of a graphical feature associated with one or more of the determined domain coordinates when the domain type is not one of the tri, isoline, or quad domain.

23. The non-transitory computer-readable medium of claim 22, further comprising instructions that, when executed, cause the one or more processors to:
receive tessellation factors;
wherein the instructions that, when executed, cause the one or more processors to output the information indicative of the graphical feature further comprise instructions that, when executed, cause the one or more processors to output the information indicative of the graphical feature based on the tessellation factors.

24. The non-transitory computer-readable medium of claim 23, wherein the information indicative of the graphical feature comprises data that indicates that the graphical feature is one of: an end cap, a line segment, and a join.

25. The non-transitory computer-readable medium of claim 22, wherein the instructions that, when executed, cause the one or more processors to determine the domain coordinates for the vertices of the received primitive further comprise instructions that, when executed, cause the one or more processors to:
determine an endpoint normal of the line segment; and
linearly interpolate u-coordinate and v-coordinate pairs of the start cap or the end cap based on the endpoint normal of the line segment and the tessellation factor for the start cap or the tessellation factor for the end cap.

26. The non-transitory computer-readable medium of claim 22, further comprising instructions that, when executed, cause the one or more processors to:
determine additional domain coordinates based on the tessellation delta value, the length of segment value, the inverse length of segment value, and the information indicative of a graphical feature;
determine information indicative of a graphical feature associated with one or more of the additional determined domain coordinates;
output the additional determined domain coordinates; and
output the determined information indicative of the graphical feature associated with the one or more additional determined domain coordinates.

27. The non-transitory computer-readable medium of claim 22, further comprising instructions that, when executed, cause the one or more processors to determine the domain coordinates based on a dashing pattern, wherein the dashing pattern is stored as state in the tessellation unit.

28. The non-transitory computer-readable medium of claim 22, wherein the instructions that, when executed, cause the one or more processors to determine the domain coordinates for vertices of a received primitive further comprise instructions that, when executed, cause the one or more processors to output the determined domain coordinates for the vertices, and output the information indicative of the graphical feature in a first pass, wherein the non-transitory computer-readable medium further comprising instructions that, when executed, cause the one or more processors to:
receive tessellation factors output by the tessellation unit in the first pass;
in a second pass, determine additional domain coordinates for vertices based on the tessellation factors received in the first pass;
determine information indicative of a graphical feature for one or more of the additional domain coordinates;
output the additional domain coordinates; and output the information indicative of the graphical feature associated with one or more of the additional domain coordinates.

\* \* \* \* \*